US008472052B2

(12) United States Patent
Asano

(10) Patent No.: US 8,472,052 B2
(45) Date of Patent: Jun. 25, 2013

(54) IMAGE READER CONVERTING IMAGE DATA INTO A DATA FORMAT CORRESPONDING TO AN APPLICATION PROGRAM, IMAGE READING SYSTEM WITH THE READER AND IMAGE READING METHOD FOR THE SYSTEM

(75) Inventor: Yoko Asano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 788 days.

(21) Appl. No.: 12/616,270

(22) Filed: Nov. 11, 2009

(65) Prior Publication Data
US 2010/0118344 A1 May 13, 2010

(30) Foreign Application Priority Data
Nov. 12, 2008 (JP) ................................. 2008-289979

(51) Int. Cl.
*G06F 3/12* (2006.01)
(52) U.S. Cl.
USPC ......... 358/1.15; 358/1.13; 715/239; 715/249; 715/762
(58) Field of Classification Search
USPC .. 358/1.15, 1.16, 1.13; 710/3, 9, 17; 709/205, 709/217, 218; 715/744, 748
See application file for complete search history.

(56) References Cited

U.S. PATENT DOCUMENTS

| 7,304,759 | B2* | 12/2007 | Kiyono et al. | 358/1.15 |
|---|---|---|---|---|
| 2003/0011633 | A1* | 1/2003 | Conley et al. | 715/762 |
| 2005/0052677 | A1* | 3/2005 | Maruyama | 358/1.13 |
| 2005/0213133 | A1* | 9/2005 | Shibata et al. | 358/1.15 |
| 2007/0185974 | A1* | 8/2007 | Kawasaki | 709/217 |
| 2008/0235303 | A1* | 9/2008 | Sensu et al. | 710/3 |
| 2009/0106666 | A1* | 4/2009 | Nomura | 715/748 |

FOREIGN PATENT DOCUMENTS

| JP | 2003-177997 A | 6/2003 |
|---|---|---|
| JP | 2005-277667 A | 10/2005 |
| JP | 2008-072517 A | 3/2008 |

* cited by examiner

*Primary Examiner* — Benny Q Tieu
*Assistant Examiner* — Juan M Guillermety
(74) *Attorney, Agent, or Firm* — Rabin & Berdo, P.C.

(57) ABSTRACT

An image reader and an external terminal are connected to each other through a network. The image reader includes a reading unit, a reception section, a data conversion section, a transmission data generation section and a transmission section. The reading unit reads an image. The reception section receives terminal information from the external terminal. The data conversion section converts image data read by the reading unit into a predetermined data format based on the terminal information. The transmission data generation section adds additional information, which relates to processing of the converted image data, to the converted image data to generate transmission data. The transmission section transmits the transmission data to the external terminal.

16 Claims, 27 Drawing Sheets

FIG. 8

| APPLICATION PROGRAM | FILE FORMAT |
|---|---|
| IMAGE EDITING SOFTWARE A | BMP, JPEG, GIF, TIFF |
| IMAGE EDITING SOFTWARE B | BMP, JPEG, GIF, PSP |
| TEXT EDITING SOFTWARE C | PDF |
| IMAGE EDITING SOFTWARE D | BMP, JPEG, GIF |
| IMAGE EDITING SOFTWARE E | BMP, JPEG, PCT |
|  |  |

DATA FORMAT LIST

FIG. 9

| APPLICATION PROGRAM | FILE FORMAT |
|---|---|
| IMAGE EDITING SOFTWARE A | BMP, JPEG, GIF, TIFF |
| IMAGE EDITING SOFTWARE B | BMP, JPEG, GIF, PSP |
| TEXT EDITING SOFTWARE C | PDF |
|  |  |

232

TERMINAL INFORMATION LIST

CONNECTION CONFIRMATION REQUEST DATA

TERMINAL INFORMATION REQUEST DATA

IMAGE DATA WITH SETUP INFORMATION

TERMINAL INFORMATION RESPONSE DATA

| TERMINAL INFORMATION RESPONSE ITEMS | |
|---|---|
| PC2 | |
| C : ¥documents¥file | |
| IMAGE EDITING SOFTWARE A | BMP, JPEG, GIF, TIFF |
| IMAGE EDITING SOFTWARE B | BMP, JPEG, GIF, PSP |
| TEXT EDITING SOFTWARE C | PDF |
| | |

- PC ID
- PATH
- APPLICATION PROGRAM FILE FORMAT

FIG. 15

| APPLICATION / FOLDER RELATIONAL TABLE ||
|---|---|
| APPLICATION PROGRAM | PATH |
| IMAGE EDITING SOFTWARE A | C : ¥document¥file¥softwareA |
| IMAGE EDITING SOFTWARE B | C : ¥document¥file¥softwareB |
| TEXT EDITING SOFTWARE C | C : ¥document¥file¥softwareC |
| | |
| | |
| | |
| | |

| APPLICATION PROGRAM | FILE FORMAT | START PATH |
|---|---|---|
| IMAGE EDITING SOFTWARE A | BMP, JPEG, GIF, TIFF | C: ¥program files ¥softwareA. exe |
| IMAGE EDITING SOFTWARE B | BMP, JPEG, GIF, PSP | C: ¥program files ¥softwareB. exe |
| TEXT EDITING SOFTWARE C | PDF | C: ¥program files ¥softwareC. exe |

TERMINAL INFORMATION LIST

IMAGE READER CONVERTING IMAGE DATA INTO A DATA FORMAT CORRESPONDING TO AN APPLICATION PROGRAM, IMAGE READING SYSTEM WITH THE READER AND IMAGE READING METHOD FOR THE SYSTEM

CROSS-REFERENCE TO RELATED APPLICATION

This application claims priority based on 35 USC 119 from prior Japanese Patent Application No. P 2008-289979, filed on Nov. 12, 2008, the entire contents of which are incorporated herein by reference.

BACKGROUND OF THE INVENTION

1. Field of the Invention

This application relates to an image reader, an image reading system and an image reading method.

2. Description of the Related Art

A scanner as an image reader capable of sending image data to a computer is well known. When a user specifies a data format of the image data to be read, the scanner converts the image data into the data format and sends the converted image data to the computer. The computer stores the converted image data in a memory. Thereafter, the user starts an application program capable of processing the converted image data to display or edit the data. Japanese Patent Laid-Open No. 2003-177997 discloses one such image reading system.

In the aforementioned image reading system, in order to display or edit the converted image data, it is necessary for the user to specify the application program and also the converted image data in the computer. However, it is frequently difficult for the user to find the location where the converted image data is stored. This causes adverse effects on the usability of the image reading system.

SUMMARY OF THE INVENTION

An object of the application is to disclose an image reader, an image reading system and an image reading method capable of processing image data smoothly in the computer.

An image reader is connected with an external terminal through a network. The image reader includes a reading unit, a reception section, a data conversion section, a transmission data generation section and a transmission section. The reading unit reads an image. The reception section receives terminal information from the external terminal. The data conversion section converts image data read by the reading unit into a predetermined data format based on the terminal information. The transmission data generation section adds additional information, which relates to processing of the converted image data, to the converted image data to generate transmission data. The transmission section transmits the transmission data to the external terminal.

In another aspect, an image reading system includes the image reader and an external terminal. The external terminal includes a data reception section and a controller. The data reception section receives the transmission data from the image reader. The controller processes the converted image data based on the additional information included in the transmission data.

In still another aspect, an image reading method is performed by an image reading system that includes an image reader and an external terminal. The method includes requesting terminal information from the external terminal by the image reader, transmitting the terminal information from the external terminal to the image reader, reading an image in the image reader, converting the image data into a predetermined data format based on the terminal information in the image reader, generating transmission data by adding to the converted image data in the image reader, additional information relating to processing of the converted image data, and transmitting the transmission data from image reader to the external terminal.

The full scope of applicability of the image reader, the image reading system and the image reading method will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The image reader, the image reading system and the image reading method will become more fully understood from the detailed description given herein and the accompanying drawings, which are given by way of illustration only, and thus do not limit the invention, and wherein:

FIG. 8 is a data format list of the first embodiment;

FIG. 9 is a terminal information list of the first embodiment;

FIG. 15 is an application/folder relational table in the scanner of the first embodiment;

FIG. 22 is a terminal information list of the second embodiment;

DETAILED DESCRIPTION OF THE INVENTION

Preferred embodiments of an image reader, an image reading system and an image reading method according to the invention will be described in detail with reference to the accompanying drawings. In each embodiment, the description will be given with a scanner as an image reader.

First Embodiment

Figure 1:
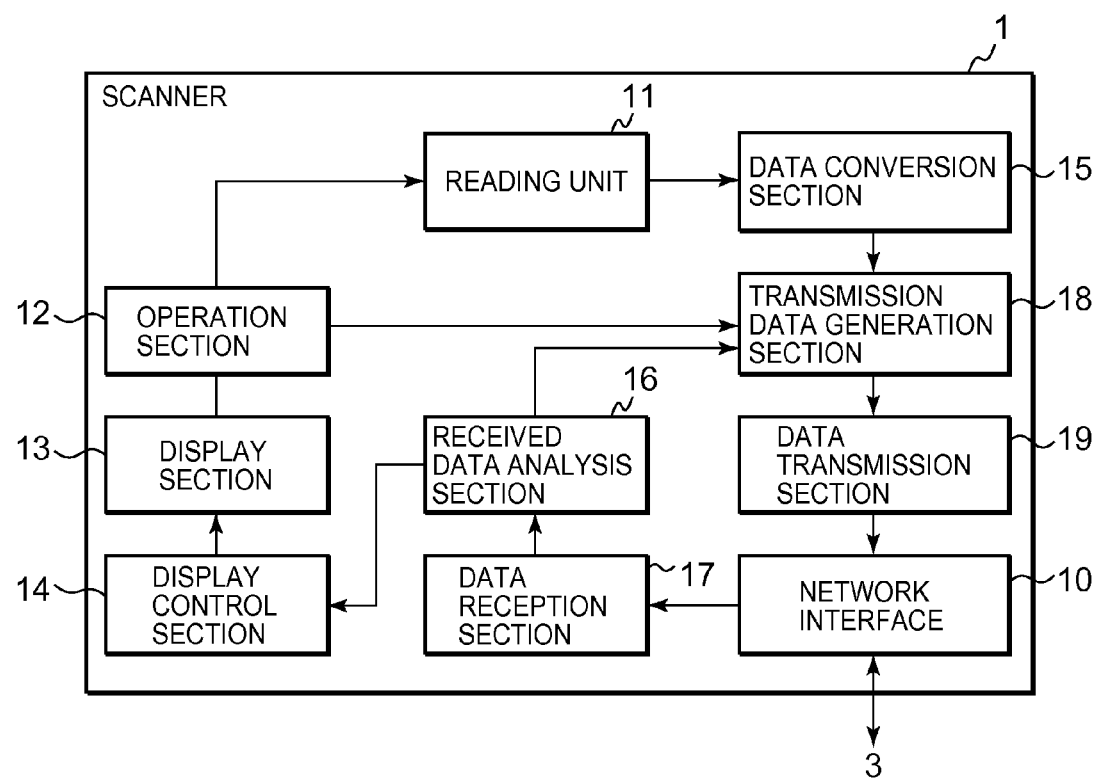
FIG. 1 is a block diagram of a scanner of a first embodiment.

FIG. 1 is a block diagram of a scanner 1 according to a first embodiment, which may include a network interface 10, a data reception section 17, a received data analysis section 16, a display section 13, a display control section 14, an operation section 12, a reading unit 11, a data conversion section 15, a transmission data generation section 18 and a data transmission section 19. The network interface 10 transmits and receives data through a network 3 shown in FIG. 2. The data reception section 17 receives the data from the network interface 10 and the received data analysis section 16 analyzes the data. The display section 13 displays setup items under the control of the display control section 14, on the basis of analysis results from the received data analysis section 16. The operation section 12 is used by a user to operate the scanner 1. The reading unit 11 reads an image of a document and the data conversion section 15 converts image data read by the reading unit 11 into a file format (data format) specified by the user. The transmission data generation section 18 generates transmission data such as terminal information request data, connection confirmation request data and image data that has been converted by the data conversion section 15. The data transmission section 19 transmits the transmission data to external terminals through the network interface 10 and the network 3.

Figure 2:
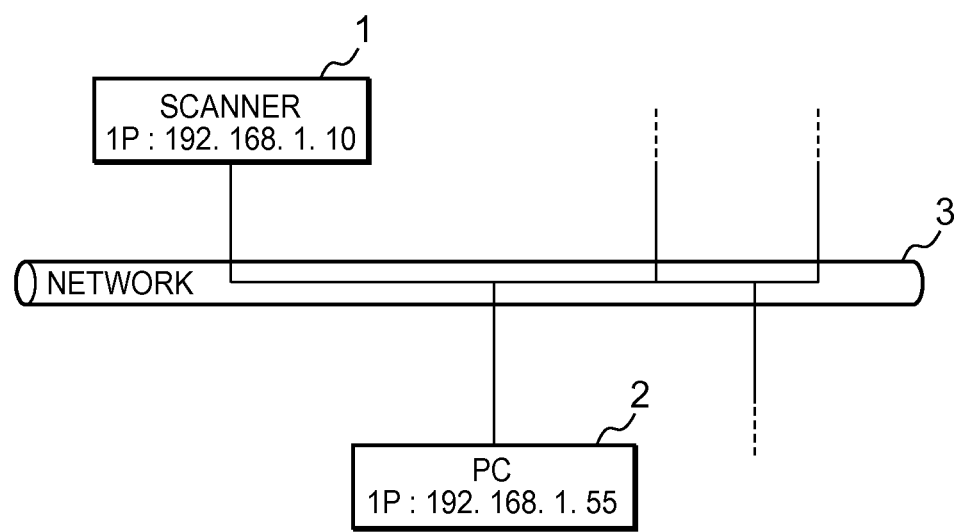
FIG. 2 is a connection diagram of a network of the first embodiment.

FIG. 2 is a connection diagram of the network 3, to which the scanner 1 and at least one personal computer (hereinafter, referred to as "PC") 2 are connected.

Figure 3:
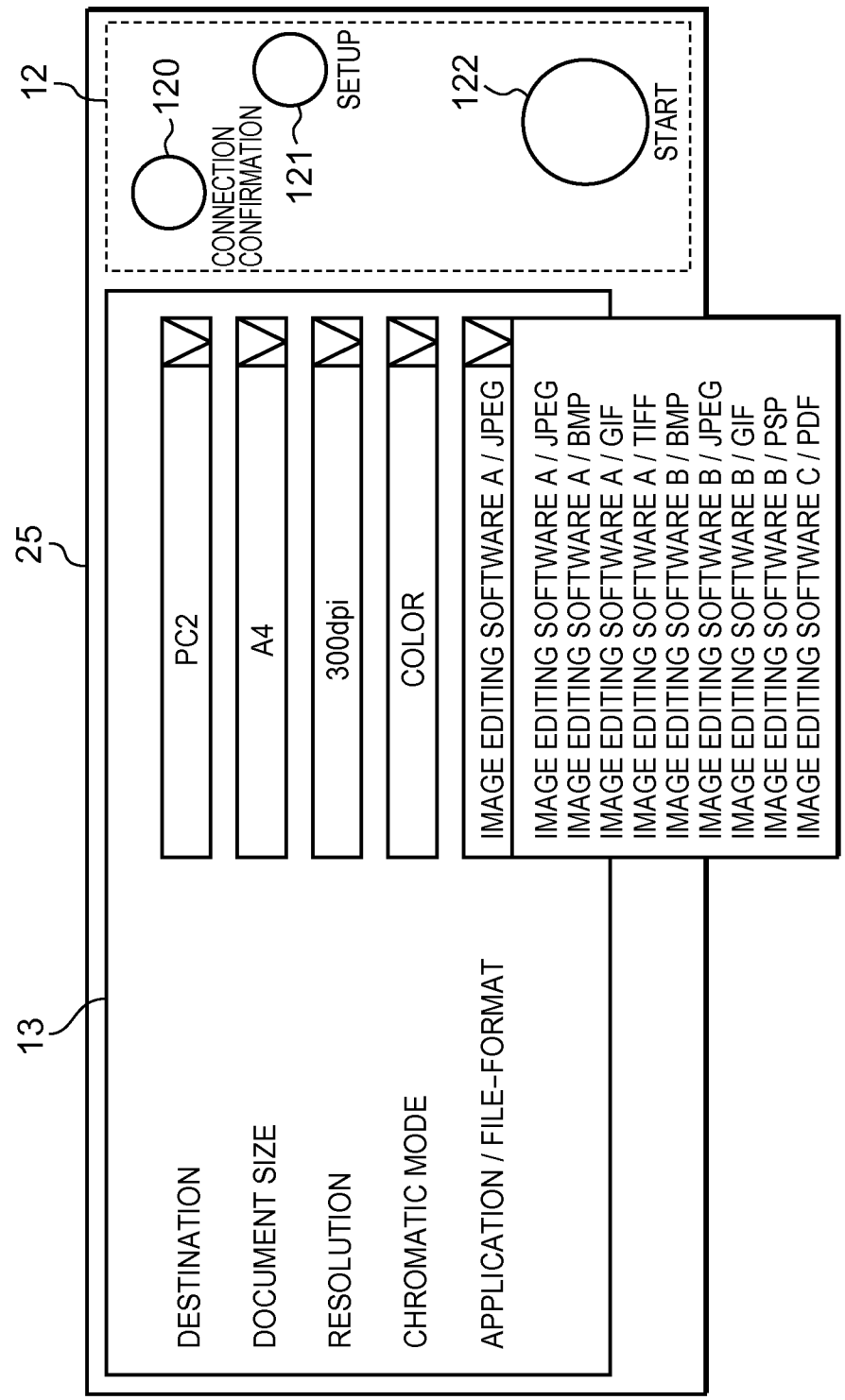
FIG. 3 is a schematic view of a display panel mounted to the scanner of the first embodiment.

FIG. 3 is a schematic view of a display panel 25 mounted to the scanner 1. The display panel 25 may include the display section 13 of a touch panel type and the operation section 12. The display panel 25 is provided on the scanner 1 so that the user can easily touch, operate and view the panel.

Referring to FIG. 3, the operation section 12 may have a connection confirmation button 120, a setup button 121 and a start button 122. By touching or holding down the connection confirmation button 120, the user can provide an instruction to the transmission data generation section 18 to generate the connection confirmation request data, which is request data to confirm the connection of the external terminals with the scanner 1. By touching or holding down the setup button 121, the user can provide an instruction to the transmission data generation section 18 to generate the terminal information request data, which is request data to acquire the information relating to the external terminals. By touching or holding down the start button 122, the user can provide an instruction to the reading unit 11 to read an image of a document.

The display section 13 displays predetermined screens designated by the display control section 14, thereon. The screen in FIG. 3 shows a setup screen that is displayed on the display section 13 after receiving the terminal information from the PC 2. The setup screen may display setup items for setting reading parameters, and a setup item for specifying an application program and a file format. The reading parameter setup items may include the destination of image data, the size of the document to be read, the resolution and the chromatic (color or monochrome) mode. The application/file-format setup item is used to specify the application program capable of processing the image data and the file format of the image data. By touching the display section 13, the user can select and set each item displayed on the setup screen.

Figure 4:
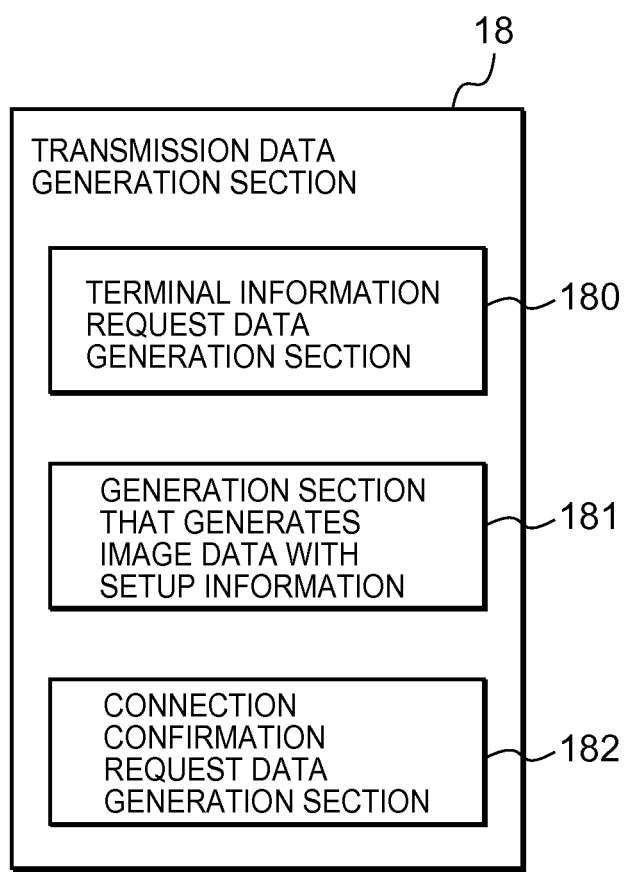
FIG. 4 is a configuration diagram of a transmission data generation section of the first embodiment.

FIG. 4 is a configuration diagram of the transmission data generation section 18, which may include a terminal information request data generation section 180, a generation section 181 that generates image data with setup information and a connection confirmation request data generation section 182. When the user holds down the setup button 121 of the operation section 12, the terminal information request data generation section 180 generates the terminal information request data and sends it to the data transmission section 19.

The generation section 181 generates the image data with setup information on the basis of data received from the data conversion section 15 and the received data analysis section 16, and send it to the data transmission section 19. The setup information, or additional information, may include path information on a storage destination folder in the PC 2, or storage destination information for the converted image data, filename information on the converted image data, document size information, resolution information, chromatic (color or monochrome) mode information, file format information (data format information) of the converted image data, application program information corresponding to the file format and identification information of the scanner 1. The file format information (data format information) is information for identifying the file format (data format) of the converted image data. The application program information is information for identifying the application program that is available in the PC 2. The file names of the converted image data may be consecutive numbers automatically assigned by the scanner 1.

When the user holds down the connection confirmation button 120 of the operation section 12, the connection confirmation request data generation section 182 generates the connection confirmation request data and sends it to the data transmission section 19. As described above, the transmission data generation section 18 generates various transmission data on the basis of the data received from the operation section 12, the data conversion section 15 and the received data analysis section 16, and sends the transmission data to the data transmission section 19.

Figure 5:
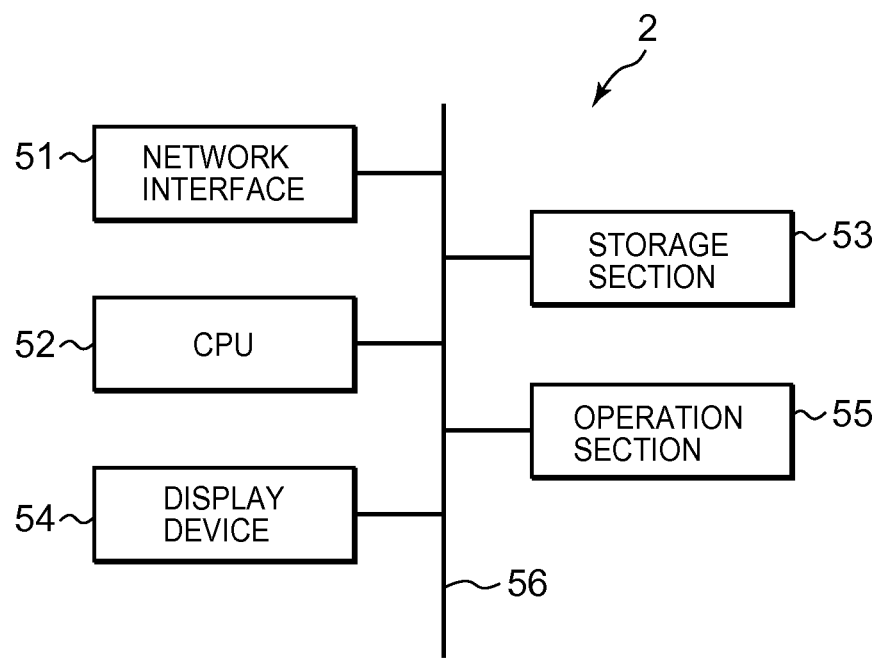
FIG. 5 is a block diagram of a PC connected to the network of the first embodiment.

FIG. 5 is a block diagram of the PC 2 connected to the network 3. The PC 2 may include a network interface 51, a CPU 52, a storage section 53, a display device 54 as a display section and an operation section 55, which are all connected by a bus 56. The CPU 52, or a controller, controls the entire PC 2.

Figure 6:
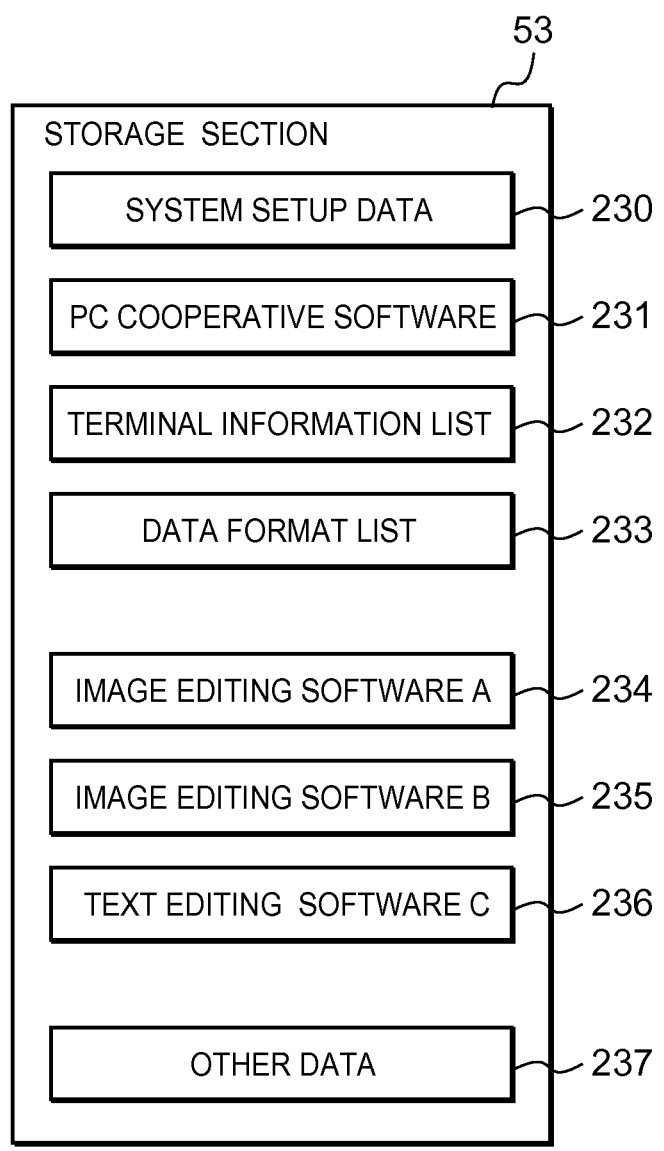
FIG. 6 is a configuration diagram of a storage section of the first embodiment.

FIG. 6 is a configuration diagram of the storage section 53, which may store system setup data 230 relating to an operating system of the PC 2, PC cooperative software 231, a terminal information list 232, a data format list 233, multiple editing software such as image editing software A 234, image editing software B 235 and text editing software C 236, and other data 237.

Figure 7:
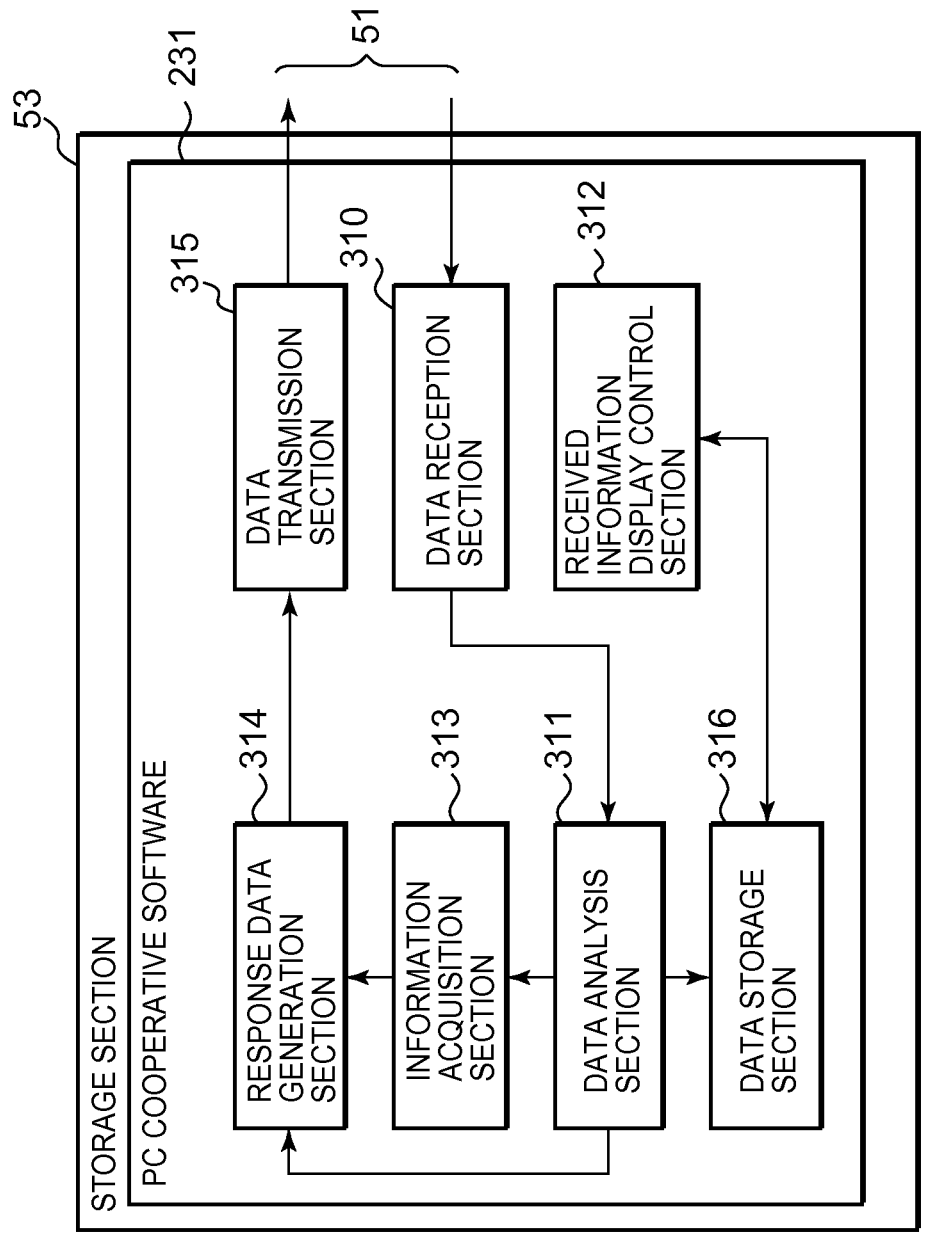
FIG. 7 is a block diagram of PC cooperative software based on the function thereof, according to the first embodiment.

FIG. 7 is a block diagram of the PC cooperative software 231 based on the function thereof. FIGS. 8 and 9 are respectively the data format list 233 and the terminal information list 232.

Referring to FIG. 7, the PC cooperative software 231 may include a data reception section 310, a data analysis section 311, a received information display control section 312, an information acquisition section 313, a response data generation section 314, a data transmission section 315 and a data storage section 316. The data reception section 310 receives the transmission data, such as the connection confirmation request data and the terminal information request data, from the scanner 1 through the network interface 51. The data analysis section 311 analyzes the transmission data. The received information display control section 312 controls the display device 54 of the PC 2 to display the transmission data thereon, if the transmission data should be displayed. The information acquisition section 313 acquires internal information on the PC 2. The response data generation section 314 generates response data to be sent to the scanner 1 and the data transmission section 315 transmits the response data to the scanner 1 through the network interface 51. The data storage section 316 stores the transmission data received by the data reception section 310 from the scanner 1.

Figure 10:
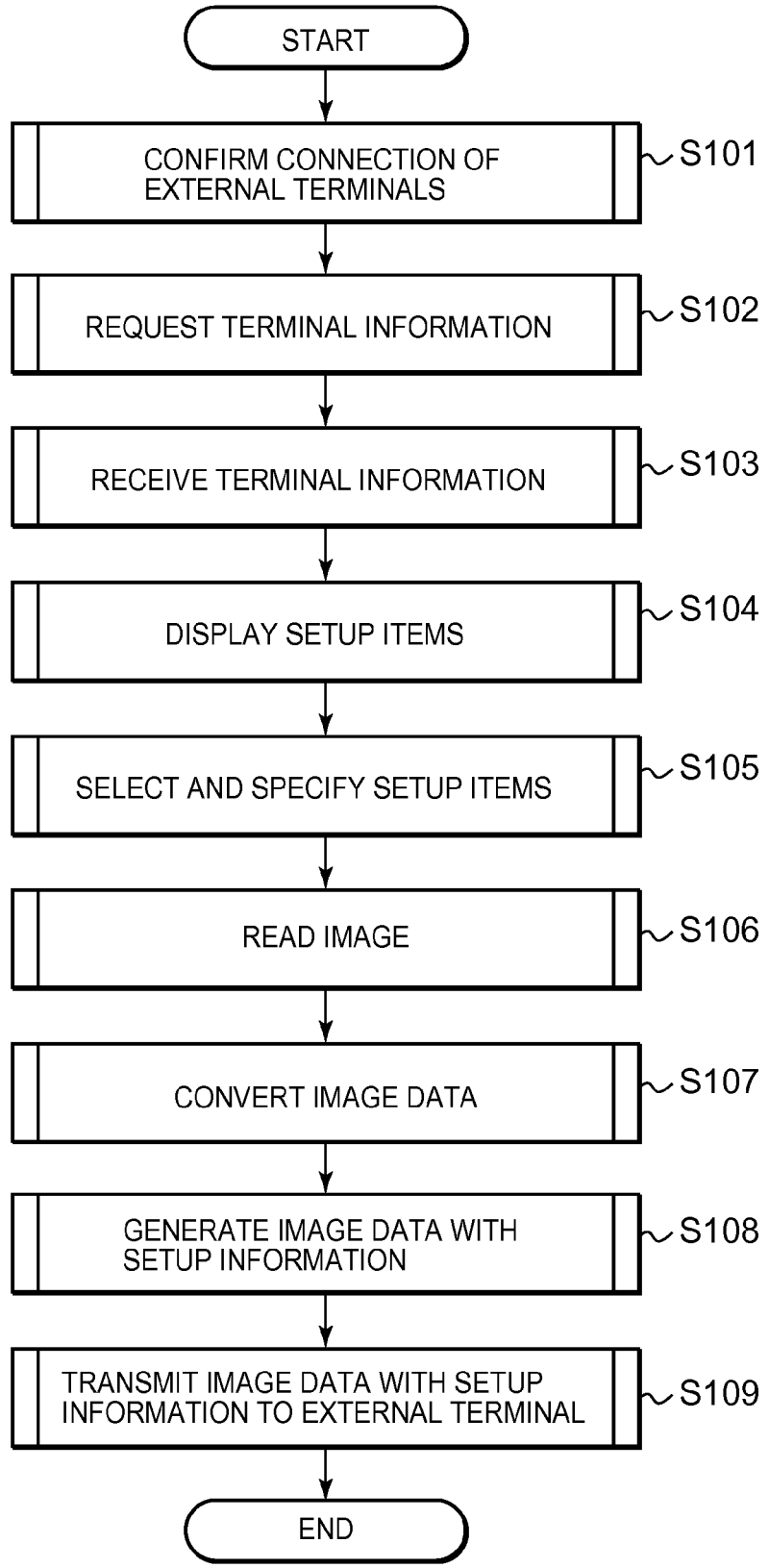
FIG. 10 is a flowchart of the operation of the scanner of the first embodiment.
Figure 11A:
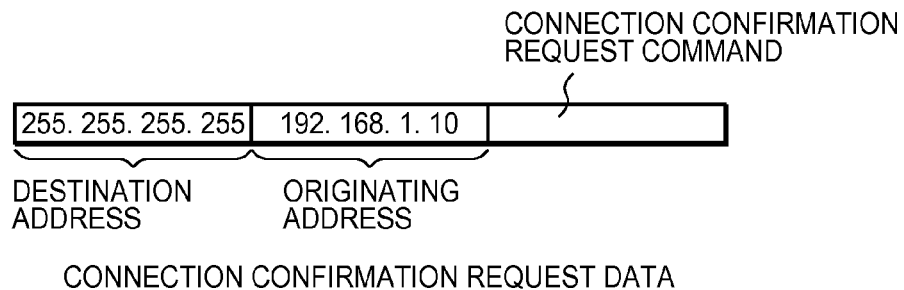
FIG. 11A is a data structure diagram of connection confirmation request data of the first embodiment.
Figure 11B:
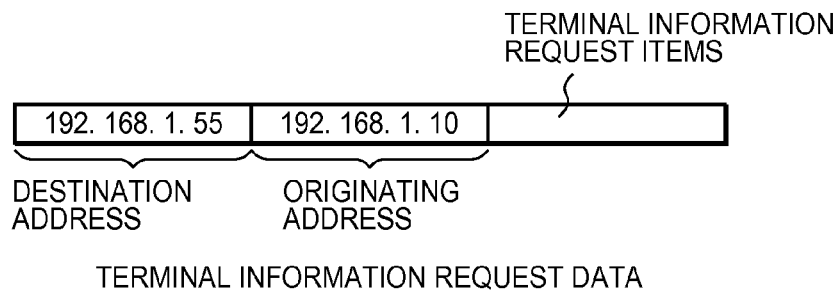
FIG. 11B is a data structure diagram of terminal information request data of the first embodiment.
Figure 11C:
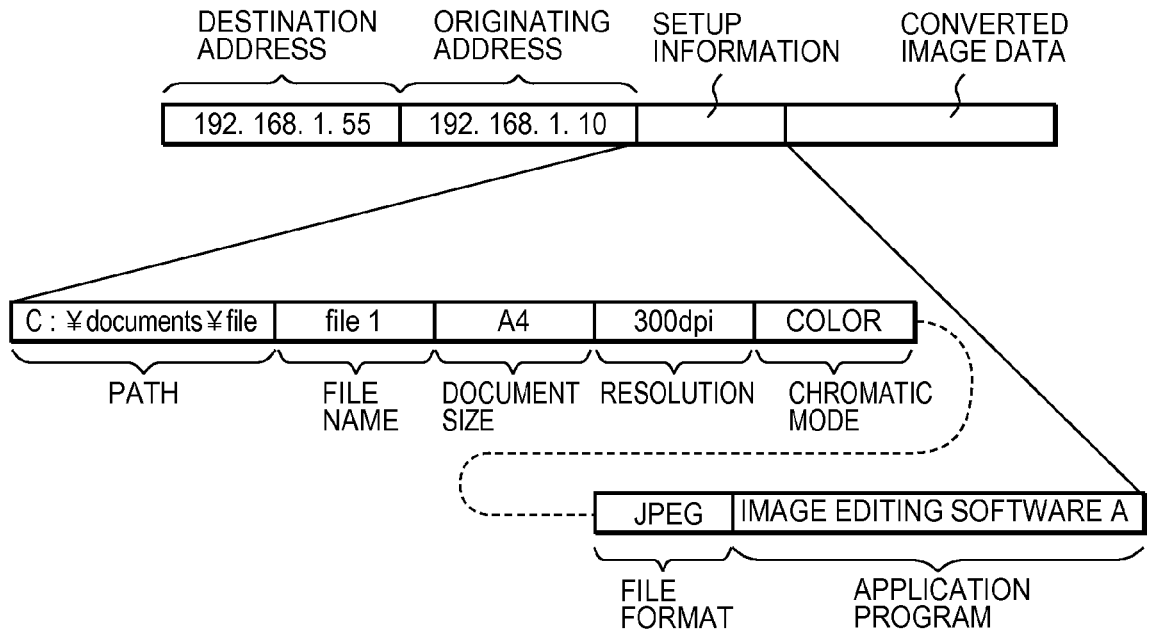
FIG. 11C is a data structure diagram of image data with setup information of the first embodiment.
Figure 12:
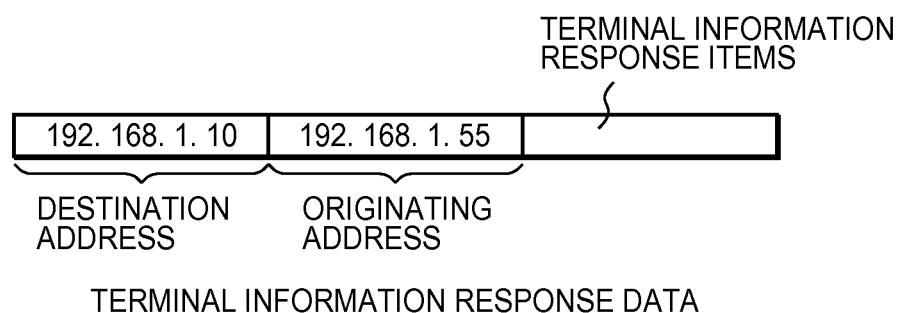
FIG. 12 is a data structure diagram of terminal information response data of the first embodiment.

FIG. 10 is a flowchart of the operation of the scanner 1. FIGS. 11A, 11B and 11C are data structure diagrams respectively of the connection confirmation request data, the terminal information request data and the image data with setup information. FIG. 12 is a data structure diagram of terminal information response data. The operation of the scanner 1 will be described with reference to FIGS. 10-12.

In step S101, when the user holds down the connection confirmation button 120 of the operation section 12, the connection confirmation request data generation section 182 of the transmission data generation section 18 generates the connection confirmation request data. The data transmission section 19 transmits the connection confirmation request data to external terminals, or PCs, through the network interface 10 and the network 3. As shown in FIG. 11A, the connection confirmation request data may include a destination IP address, or "255. 255. 255. 255," an originating IP address that is assigned to the scanner 1, or "192. 168. 1. 10," and a connection confirmation request command. The destination IP address "255. 255. 255. 255" means that the connection confirmation request data is transmitted broadcast to all the PCs connected to the network 3.

The data reception section 17 of the scanner 1 receives the connection confirmation response data from each of the PCs on the network 3 through the network interface 10 and sends the connection confirmation response data to the received data analysis section 16. The received data analysis section 16 analyzes the connection confirmation response data and sends the analysis result of the data to the display control section 14. The display control section 14 controls the display section 13 to display a list of the PCs that sent back the connection confirmation response data to the scanner 1 on the basis of the analysis result. The user can confirm the PCs that are connected to the scanner 1 by the list.

In step S102, when the user selects the PC 2 from the list displayed on the display section 13 and holds down the setup button 121, the terminal information request data generation section 180 of the transmission data generation section 18 generates the terminal information request data. The data transmission section 19 transmits the terminal information request data to the PC 2 through the network interface 10 and the network 3. As shown in FIG. 11B, the terminal information request data may include a destination IP address that is assigned to the PC 2, or "192. 168. 1. 55," and an originating IP address that is assigned to the scanner 1, or "192. 168. 1. 10," and also may include request items for acquiring terminal information on the PC 2. The terminal information request items correspond to response items of the terminal information on the PC 2. As described later, the terminal information response items may include PC information (e.g. identification information of the PC 2), path information on a storage destination folder for the converted image data in the PC 2, application program information and file format information (data format information) corresponding to the application program. The application program information notifies names of application programs that are available in the PC 2.

In step S103, the data reception section 17 of the scanner 1 receives the terminal information response data, which is the response data relating to the terminal information, from the PC 2 through the network interface 10. As shown in FIG. 12, the terminal information response data may include a destination IP address that is assigned to the scanner 1, or "192. 168. 1. 10," an originating IP address that is assigned to the PC 2, or "192. 168. 1. 55," and terminal information response items. As described above, the terminal information response items may include the PC information (e.g. identification information on the PC 2), the path information on a storage destination folder for the converted image data in the PC 2, the application program information and the file format information (data format information) corresponding to the application program.

In step S104, the data reception section 17 sends the terminal information response data to the received data analysis section 16. The received data analysis section 16 analyzes the terminal information response data and sends the analysis result of the data to the display control section 14. The display control section 14 controls the display section 13 to display the setup items selectably thereon on the basis of the analysis result. For example, as shown in FIG. 3, a selection list is displayed in a box for an application/file-format item.

In step S105, the user selects and specifies each item displayed on the display section 13 by touching on it. For example, as shown in FIG. 3, the user selects and specifies "A4" for a document size item, "300 dpi" for a resolution item, "color" for a chromatic mode item and "image editing software A/JPEG" for an application/file-format item. Note, however, that "PC 2" is automatically selected for a destination item by the scanner 1.

In step S106, when the user holds down the start button 122 of the operation section 12, the reading unit 11 reads an image of a document in accordance with conditions specified by the user.

In step S107, the reading unit 11 sends image data to the data conversion section 15. The data conversion section 15 converts the image data into a file format specified by the user.

In step S108, the generation section 181 of the transmission data generation section 18 adds the setup information specified by the user in step S105 to the converted image data converted in step S107, thereby generating the image data with setup information. As shown in FIG. 11C, the image data with setup information may include a destination IP address that is assigned to the PC 2, or "192. 168. 1. 55," an originating IP address that is assigned to the scanner 1, or "192. 168. 1. 10," the setup information and the converted image data. The setup information may include "C: ¥document¥file" as the path information on a storage destination folder for the converted image data in the PC 2, "file1" as the file name information on the converted image data, "A4" as the document size information, "300 dpi" as the resolution information, "color" as the chromatic mode information, "JPEG" as the file format information and "image editing software A" as the application program information. The file name of the converted image data is automatically assigned by the scanner 1. However, the file name may be provided by the user. In this case, a box for a file name item may be additionally displayed on the display section 13 so that the user can input the file name of the converted image data.

In step S109, the data transmission section 19 transmits the image data with setup information generated in step S108 to the PC 2 through the network interface 10 and the network 3.

Figure 13:
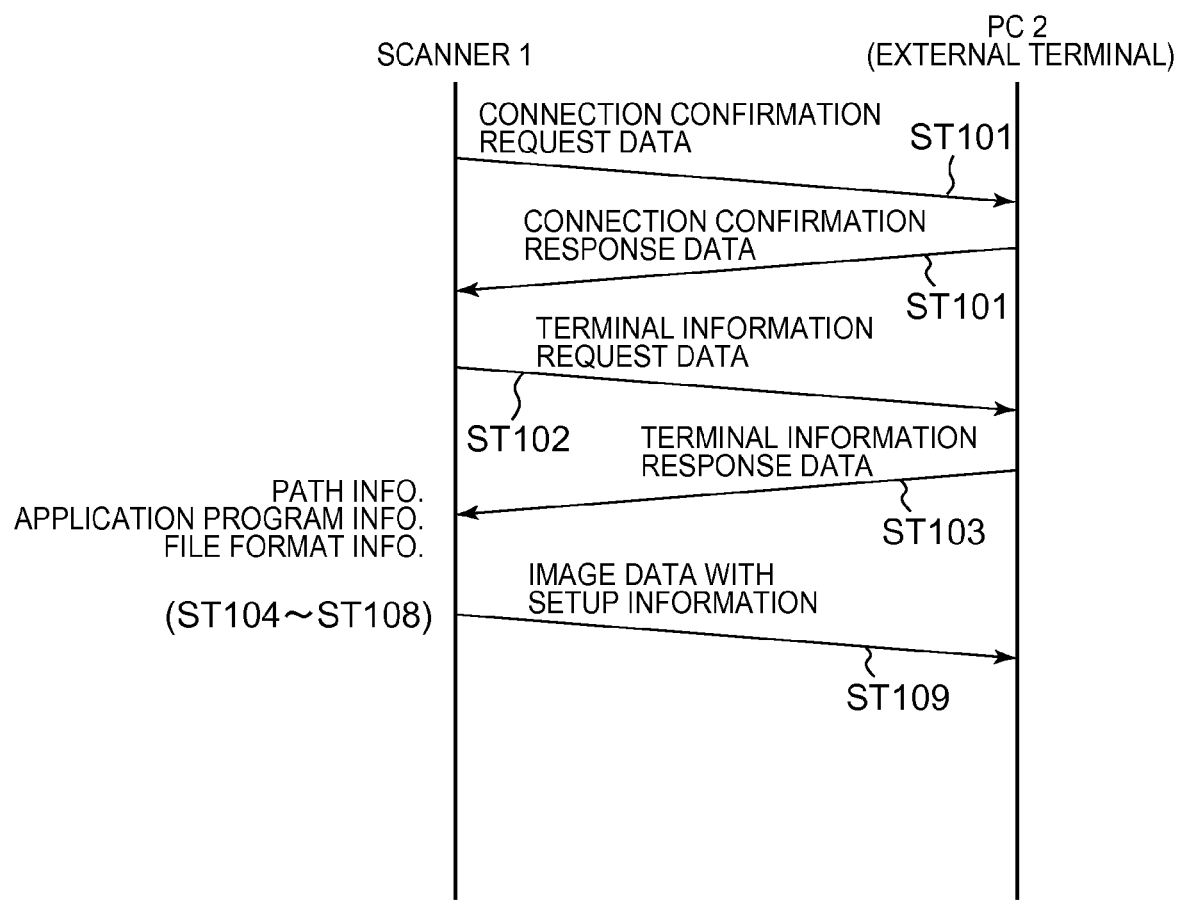
FIG. 13 is a communication diagram that shows data flow between the scanner and the PC of the first embodiment.

FIG. 13 is a communication diagram that shows data flow between the scanner 1 and the PC 2. In FIG. 13, steps similar to those shown in FIG. 10 have been given the same numerals and their description is omitted.

Next, the operation of the PC 2 will be described with reference to FIG. 7. The data reception section 310 of the PC cooperative software 231 installed on the PC 2 receives the connection confirmation request data from the scanner 1 through the network interface 51 and sends the data to the data analysis section 311. The data analysis section 311 analyzes the connection confirmation request data and commands the response data generation section 314 to generate the connection confirmation response data. The response data generation section 314 generates the connection confirmation response data and sends the data to the data transmission section 315. The data transmission section 315 transmits the connection confirmation response data to the scanner 1 through network interface 51. The connection confirmation response data may include the PC information on the PC 2 (e.g. identification information on the PC 2) and the IP address of the PC 2.

The data reception section 310 of the PC cooperative software 231 receives the terminal information request data from the scanner 1 through the network interface 51 and sends the data to the data analysis section 311. The data analysis section 311 analyzes the terminal information request data and gives a command to the information acquisition section 313. The information acquisition section 313 searches software stored in the storage section 53 of the PC 2 and compares the software searched in the storage section 53 with software listed in the data format list 233. The information acquisition section 313 creates the terminal information list 232 that defines the correspondence relationship between the software stored in the storage section 53 and file formats corresponding to the software. The storage section 53 stores the terminal information list 232. The information acquisition section 313 commands the response data generation section 314 to generate the terminal information response data.

The response data generation section 314 generates the terminal information response data shown in FIG. 12 and sends the data to the data transmission section 315. The terminal information response data may include the path information on a storage destination folder for the converted image data, the PC information (e.g. identification information on the PC 2), the application program information and the file format information corresponding to the application program. The storage destination folder has been created in the PC 2 in advance. The PC information, or the identification information on the PC 2, can be obtained from the system setup data 230 stored in the storage section 53. The application program information and the file format information can be obtained from the terminal information list 232. The data transmission section 315 transmits the terminal information response data to the scanner 1 through network interface 51. The data format list 233 may be stored in the storage section 53 when the PC cooperative software 231 is installed on the PC 2.

The data reception section 310 of the PC cooperative software 231 receives the image data with setup information from the scanner 1 through the network interface 51 and sends the data to the data analysis section 311. The data analysis section 311 analyzes the image data with setup information and gives a command to the data storage section 316. The data storage section 316 stores the converted image data, which is included in the image data with setup information, in the storage destination folder designated by the path information in the setup information. The data storage section 316 also sends the setup information to the received information display control section 312. The received information display control section 312 controls the display device 54 of the PC 2 to display the setup information thereon.

Figure 14:
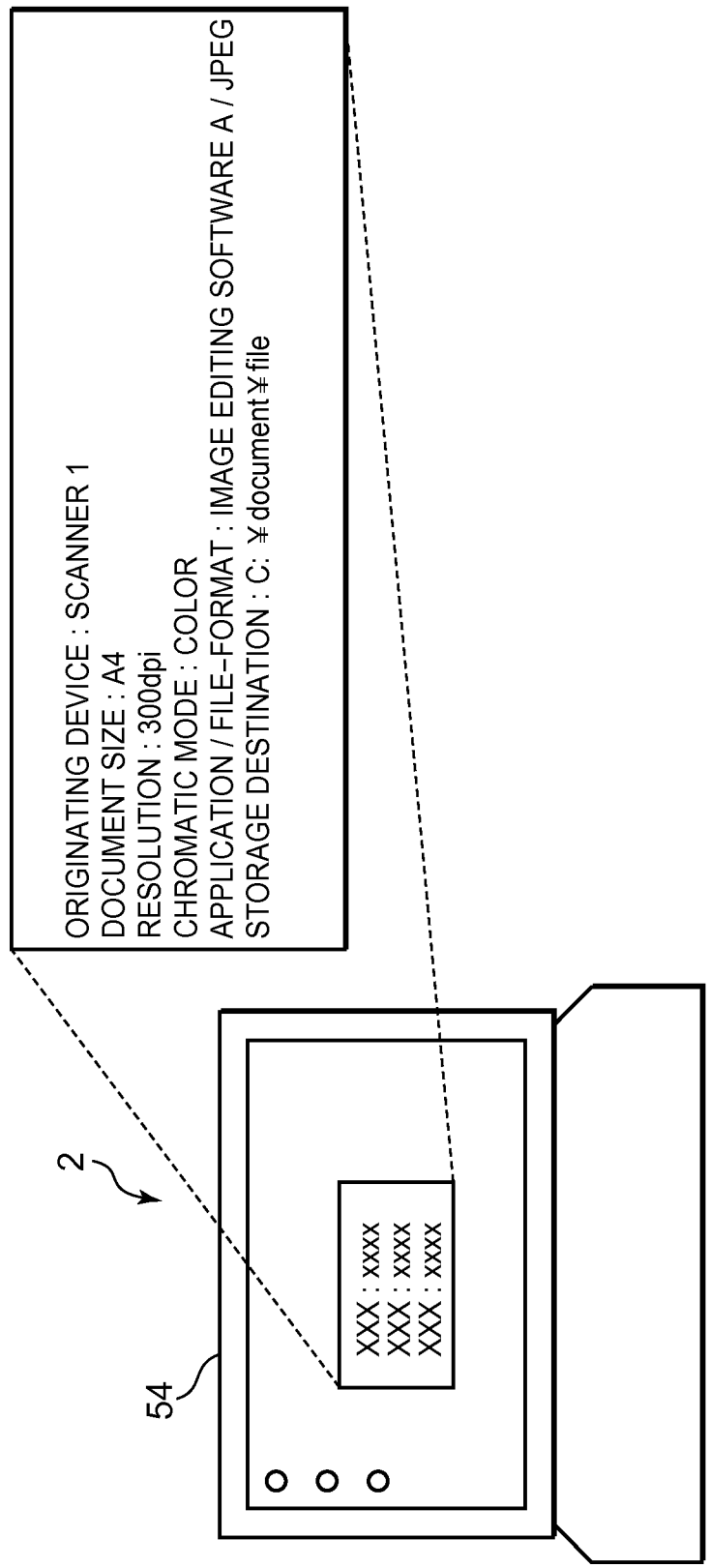
FIG. 14 is an exemplary view of a display screen of a display device, showing setup information, according to the first embodiment.

FIG. 14 is an exemplary view of a display screen of the display device 54, showing the setup information. In FIG. 14, originating device information "scanner 1," document size information "A4," resolution information "300 dpi," chromatic mode information "color," application/file-format information "image editing software A/JPEG" and storage destination information "C: ¥document¥file" are displayed on the display device 54.

As described above, in the first embodiment, the scanner 1 transmits the converted image data to the PC 2 together with the setup information. The setup information includes the path information on a storage destination folder and the file format information on the converted image data. In addition, the PC 2 displays the path information on the folder and the file format information on the data on the display device 54. Therefore, the user can easily find the location where the converted data is stored and recognize the file format of the data, thereby improving the usability of the image reading system.

Modification of First Embodiment

In the first embodiment, as shown FIG. 12, the storage destination folder for the converted image data has been created in the PC 2 in advance and the path information on the folder is sent to the scanner 1 as part of the terminal information response data. The scanner 1 transmits the converted image data to the PC 2 together with the path information, and then the PC 2 stores the converted image data in the storage destination folder designated by the path information.

In the modification of the first embodiment, a different folder is provided for each application program. The converted image data from the scanner 1 is stored in a corresponding folder provided for the application program that can process the data. Therefore, path information on the corresponding folder is added to the converted image data when the data is transmitted from the scanner 1 to the PC 2. If the corresponding folder is not in the PC 2, the scanner 1 commands the PC 2 to create a new folder and store the converted image in the new folder.

FIG. 15 is an application/folder relational table in the scanner 1, which defines the correspondence relationship between application programs in the PC 2 and path information on corresponding folders provided for the respective application programs. The application/folder relational table may be created when the scanner 1 receives the terminal information response data from the PC 2. In generating the image data with setup information shown in FIG. 11C, the generation section 181 refers to the application/folder relational table to determine whether or not the application program selected by the user is in the PC 2. If the application program selected by the user is listed in the table, the generation section 181 puts path information on the corresponding folder for the application program in the setup information.

Figure 16:
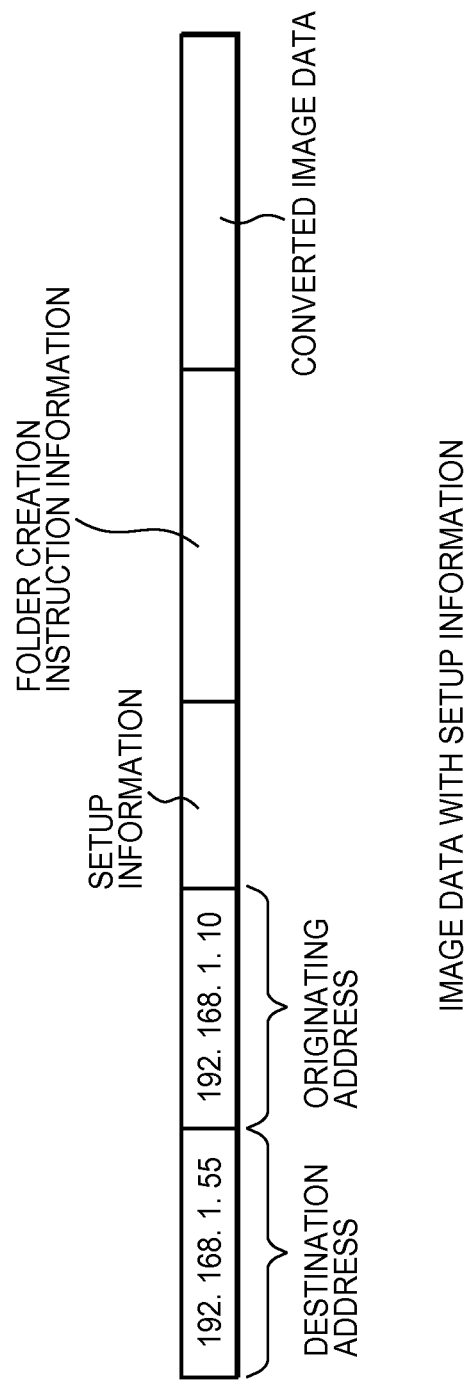
FIG. 16 is a data structure diagram of image data with setup information having folder creation instruction information of the first embodiment.

If the application program selected by the user is not listed in the table, the generation section 181 adds folder creation instruction information, or additional information, to the image data with setup information, so that the PC 2 newly creates a corresponding folder for the application program and stores the converted image in the corresponding folder. FIG. 16 shows a data structure diagram of the image data with setup information having the folder creation instruction information.

In addition, the generation section 181 adds the name of the application program selected by the user and the path information on the corresponding folder for the application program to the application/folder relational table shown in FIG. 15. Thus, the corresponding folder for the application program, which is added to the application/folder relational table, is newly created in the PC 2. For example, it is assumed that the user selects "text editing software A/JPEG" for an application/file-format item displayed on the display section 13. If the text editing software A is not in the application/folder relational table, that is, not in the PC 2, the scanner 1 commands the PC 2 to create a new folder that is named "text editing software A."

In the case of the PHP (Hypertext Preprocessor) language, any named folder can be created in the PC 2 by adding the "ftp_mkdir" command to the image data with setup information. Moreover, in the modification, path information on a storage destination folder in the terminal information response items shown in FIG. 12 can be omitted.

Thus, in the modification of the first embodiment, a different folder is provided for each application program and the converted image data is stored in a corresponding folder provided for the application program that can process the data. Therefore, the user can easily recognize the application program that he/she should use for the converted image data.

Second Embodiment

Figure 17:
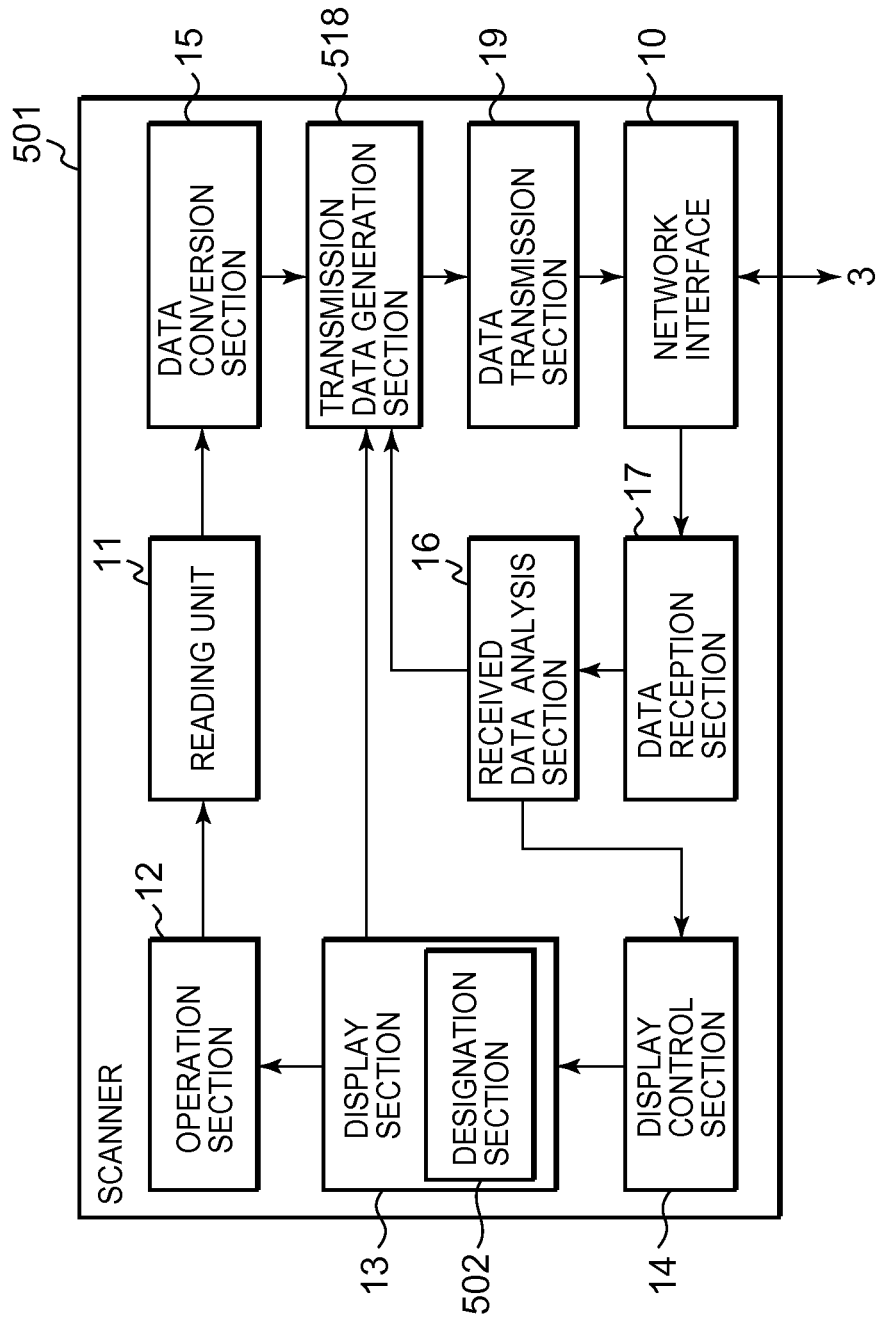
FIG. 17 is a block diagram of a scanner of a second embodiment.
Figure 18:
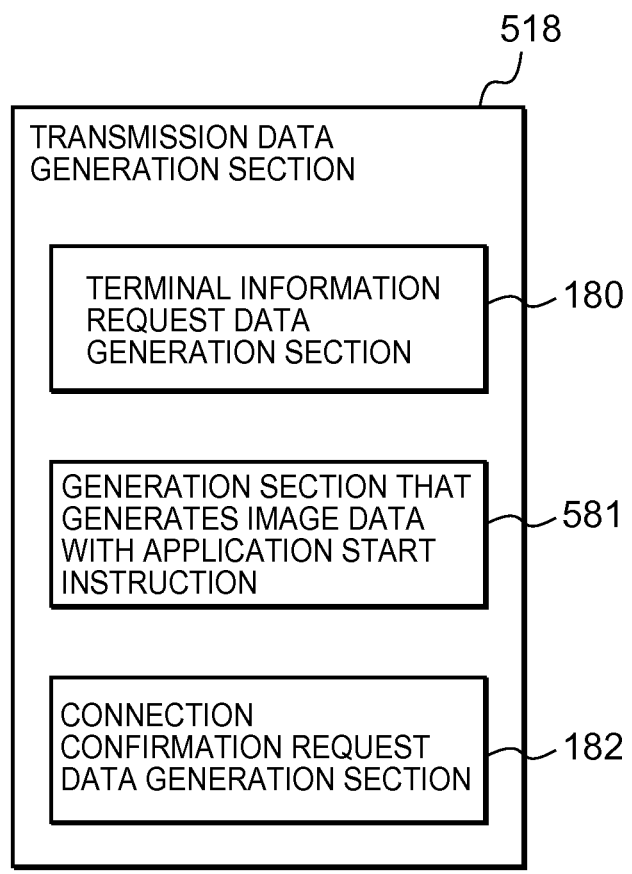
FIG. 18 is a configuration diagram of a transmission data generation section of the second embodiment.

FIG. 17 is a block diagram of a scanner 501 according to a second embodiment. FIG. 18 is a configuration diagram of a transmission data generation section 518. The second embodiment differs from the first embodiment in that a designation section 502 is added to the display section 13 and the transmission data generation section 518 is used in place of the transmission data generation section 18. Elements similar to those in the first embodiment have been given the same numerals and their description is omitted.

Through the designation section 502, the user can select and specify display format items relating to the converted image data that is to be processed by the application program in the PC 2. As shown in FIG. 18, the transmission data generation section 518 includes a generation section 581 that generates image data together with an instruction for starting the application program to process the image data on the basis of data received from the data conversion section 15 and the received data analysis section 16. The transmission data generation section 518 also includes the terminal information request data generation section 180 and the connection confirmation request data generation section 182.

Figure 19:
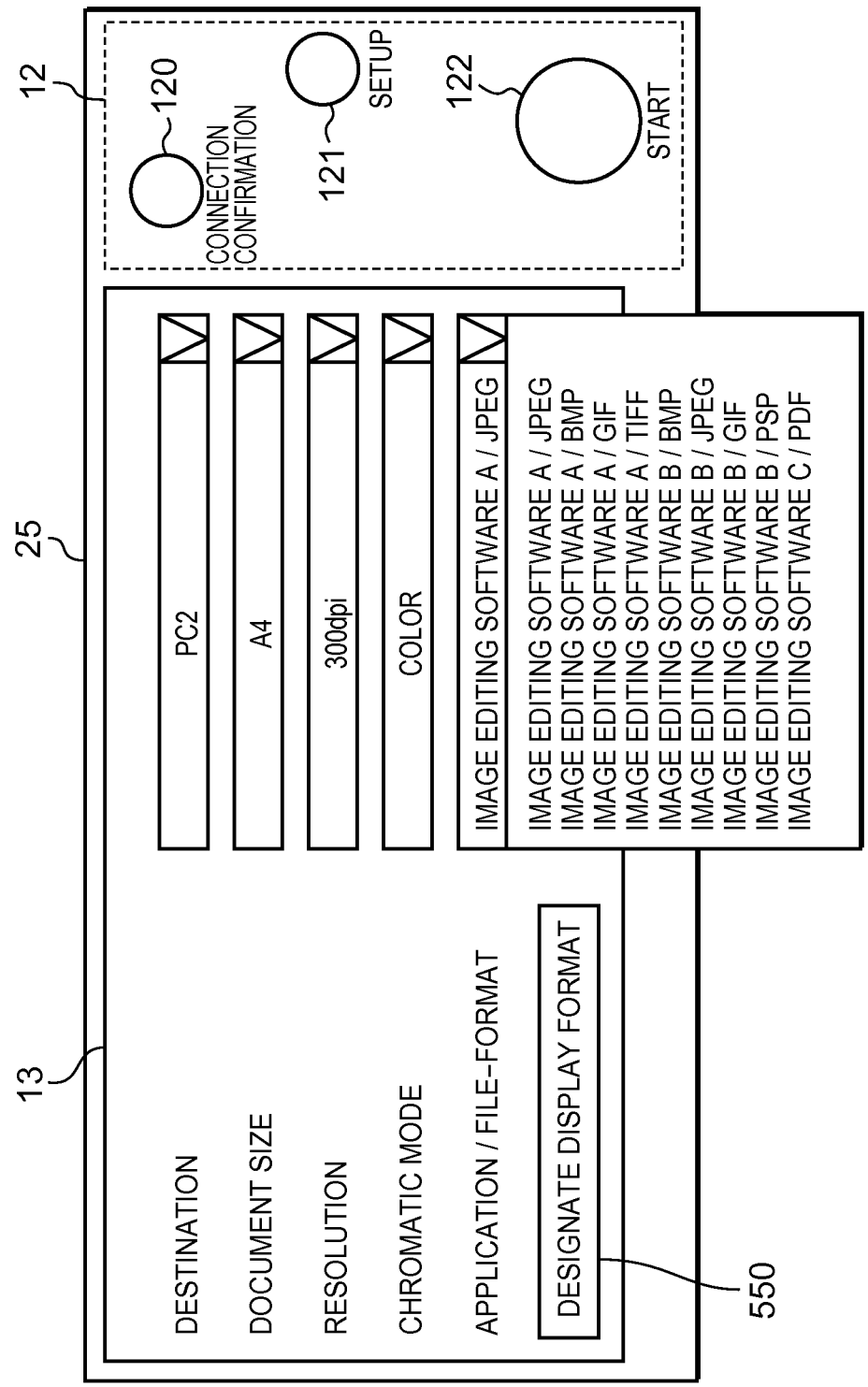
FIG. 19 is a schematic view of a display panel mounted to a scanner of the second embodiment.

FIG. 19 is a schematic view of the display panel 25 mounted to the scanner 501. The display panel 25 may include the display section 13 of a touch panel type and the operation section 12. The display panel 25 is provided on the scanner 501 so that the user can easily touch, operate and view the panel.

The display section 13 displays predetermined screens designated by the display control section 14, thereon. The screen in FIG. 19 shows a setup screen that is displayed on the display section 13 after receiving the terminal information from the PC 2. The setup screen in the second embodiments shows a display format designation button 550 in addition to the reading parameter setup items and the application/file-format setup item. The display format designation button 550 is used to switch from the setup screen to a display format designation screen on which the user can designate the display format of the converted image data. As described in the first embodiment, the reading parameter setup items may include the destination of the converted image data, the size of the document to be read, the resolution and the chromatic (color or monochrome) mode. The application/file-format setup item is used to specify an application program capable of processing the converted image data and a file format of the converted image data.

Figure 20:
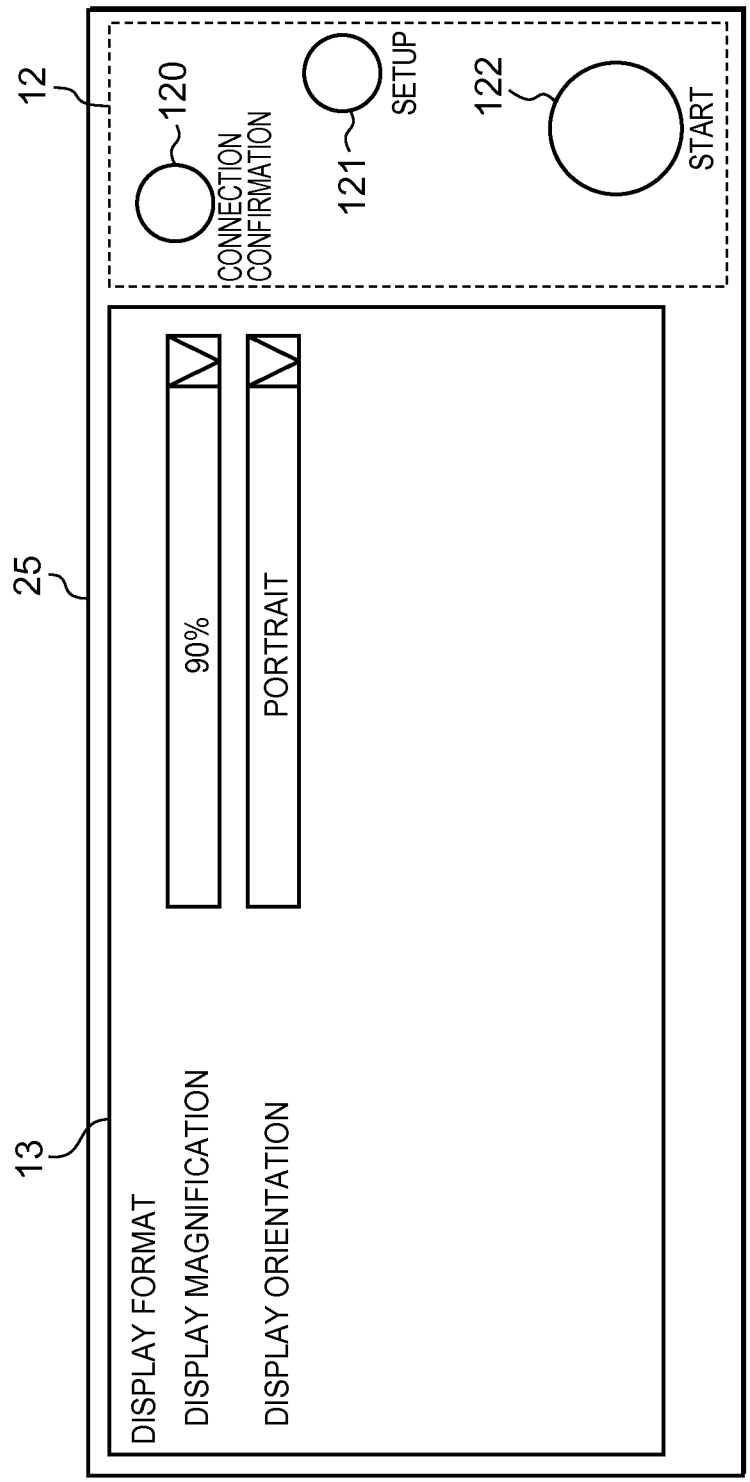
FIG. 20 is a view of a display format designation screen of a display section of the second embodiment.

FIG. 20 is a view of the display format designation screen of the display section 13. As above described, the display format designation screen is displayed on the display section 13 when the user touches the display format designation button 550. The user can specify display magnification and display orientation of the converted image data on the display format designation screen.

Next, the structure of the PC 2 will be described. In the second embodiment, the scanner 501 is connected to the network 3 in place of the scanner 1. The PC 2 is connected to the network 3 as in the first embodiment. In the second embodiment, however, the PC cooperative software 231 and the terminal information list 232 are respectively replaced with PC cooperative software 631 and a terminal information list 632.

Figure 21:
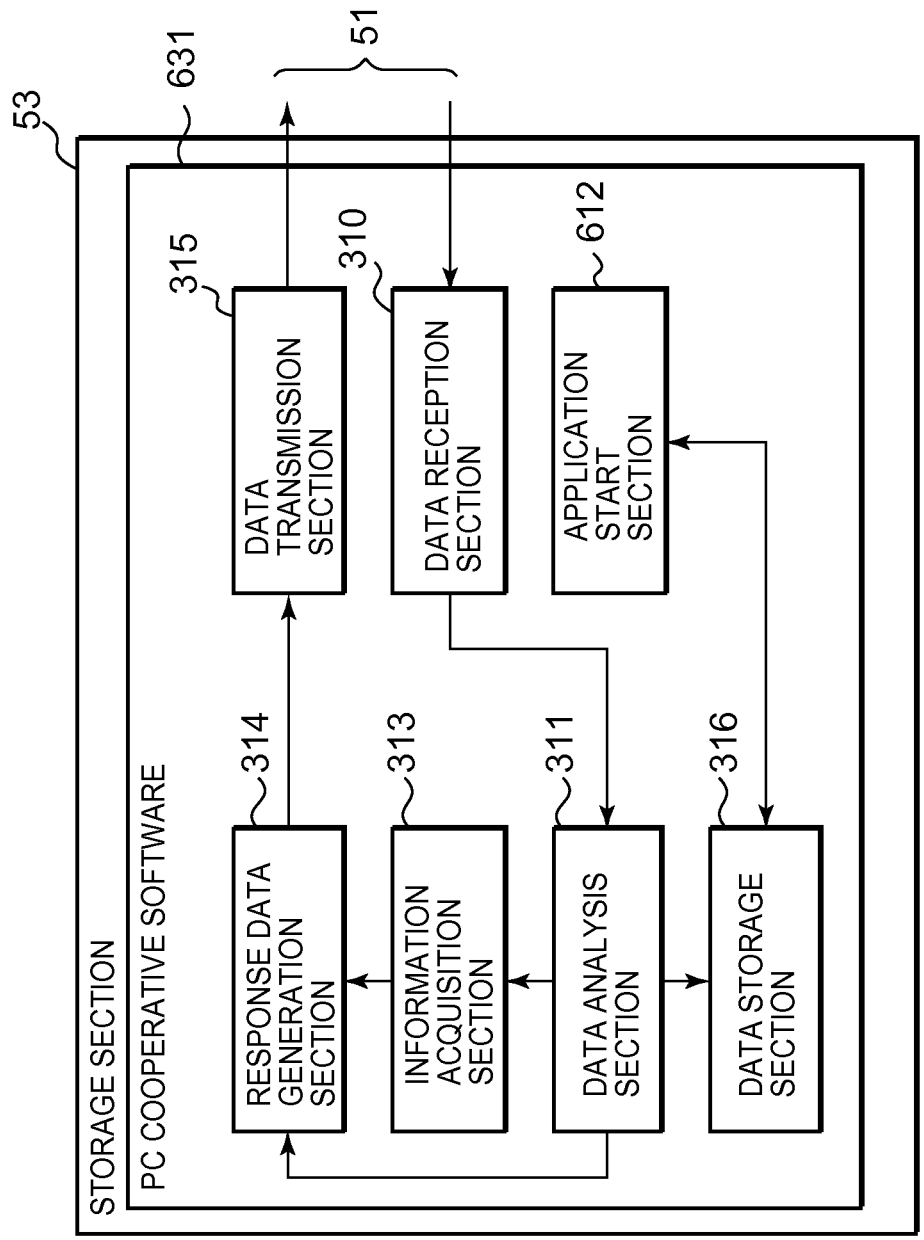
FIG. 21 is a block diagram of PC cooperative software based on the function thereof, according to the second embodiment.

FIG. 21 is a block diagram of the PC cooperative software 631 based on the function thereof, in which the received information display control section 312 of the first embodiment is replaced with an application start section 612. FIG. 22 is a terminal information list 632, which includes start path information in addition to the application program information and the file format information of the terminal information list 232. The start path information is used to start each application program.

Figure 23:
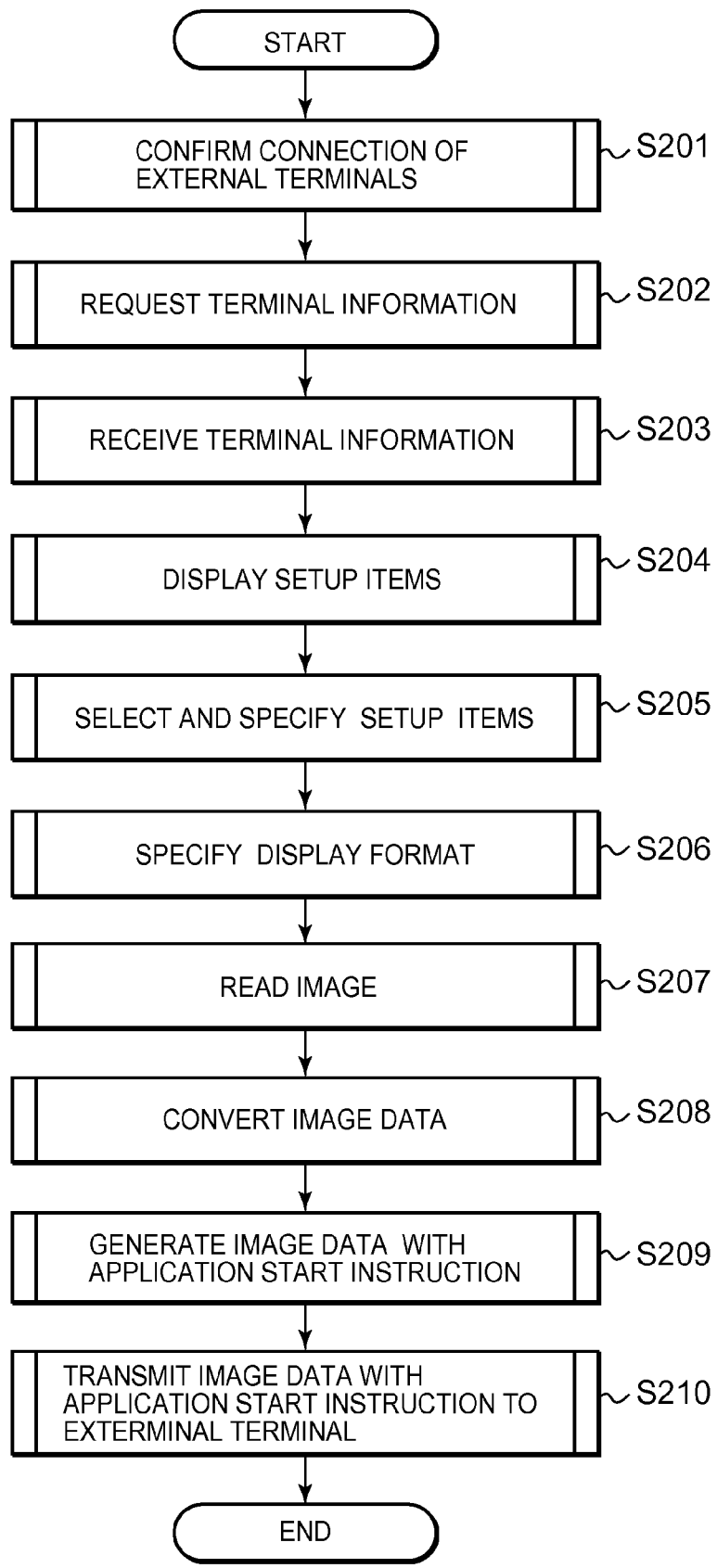
FIG. 23 is a flowchart of the operation of the scanner of the second embodiment.
Figure 24:
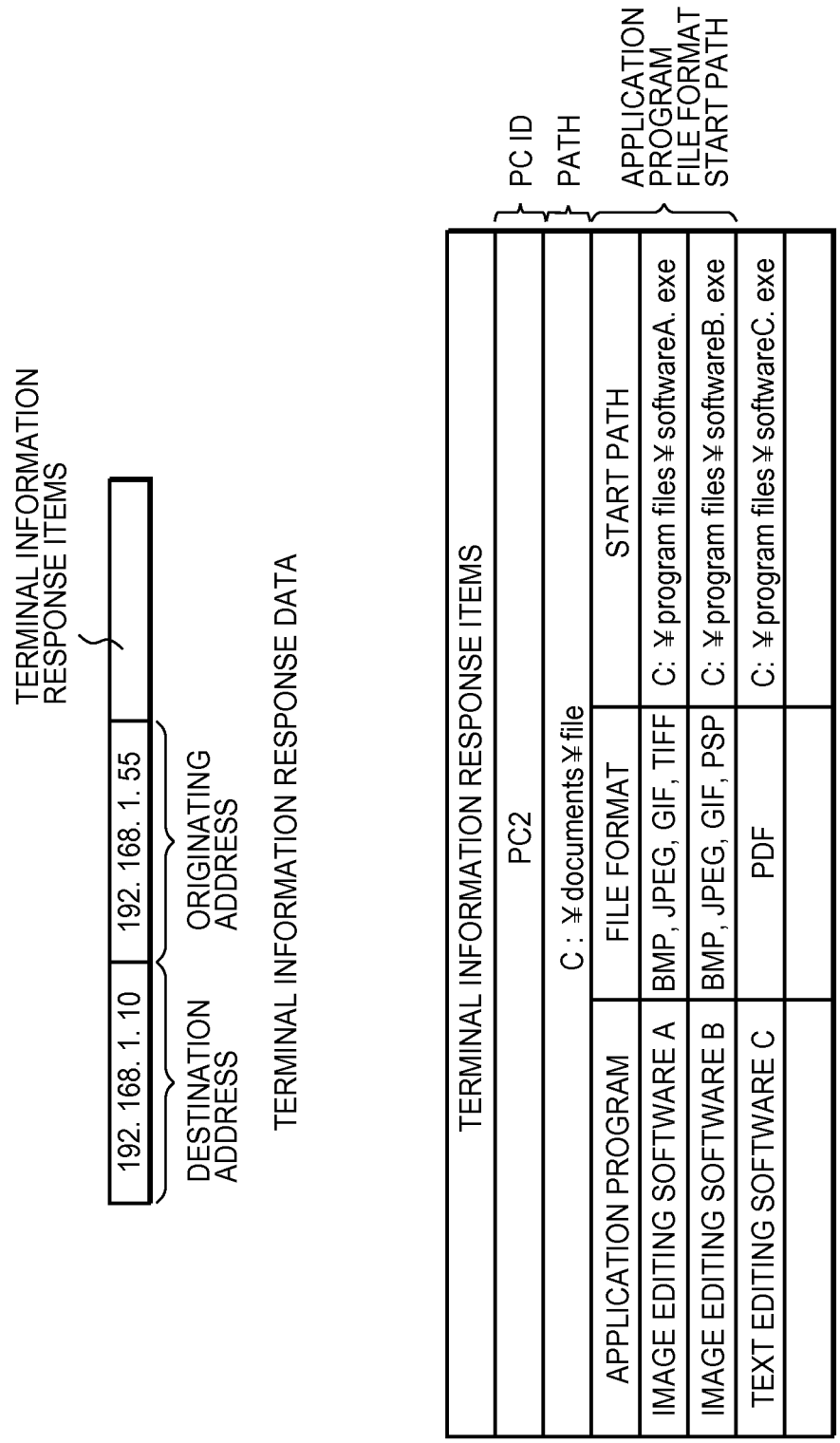
FIG. 24 is a data structure diagram of terminal information response data of the second embodiment.
Figure 25:
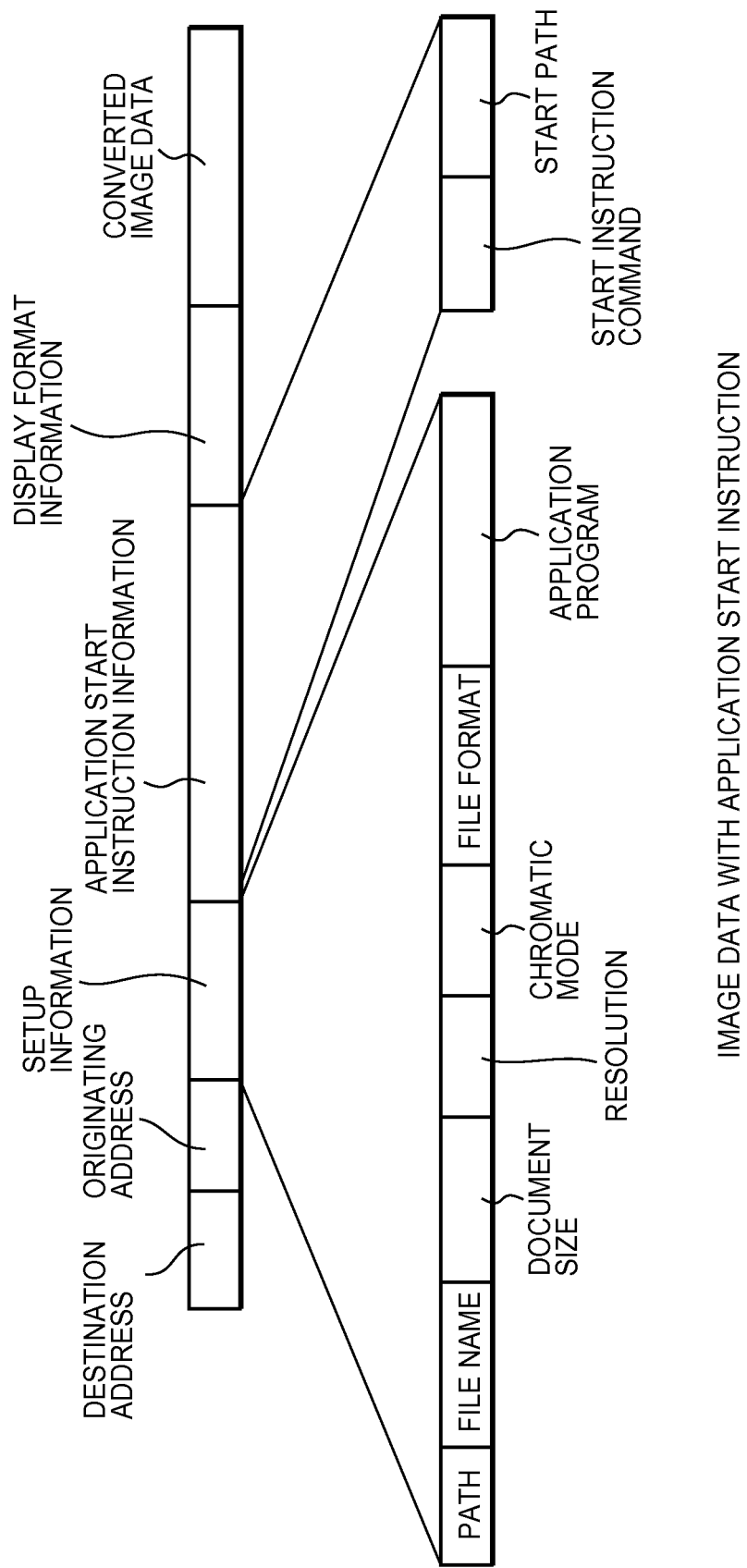
FIG. 25 is a data structure diagram of image data with application start instruction of the second embodiment.

FIG. 23 is a flowchart of the operation of the scanner 501. FIG. 24 is a data structure diagram of terminal information response data. FIG. 25 is a data structure diagram of the image data with application start instruction. The operation of the scanner 501 will be described with reference to FIGS. 23-25.

In step S201, when the user holds down the connection confirmation button 120 of the operation section 12, the connection confirmation request data generation section 182 of the transmission data generation section 518 generates the connection confirmation request data. The data transmission section 19 transmits the connection confirmation request data to external terminals, or PCs, through the network interface 10 and the network 3.

The data reception section 17 of the scanner 501 receives the connection confirmation response data from each of the PCs on the network 3 through the network interface 10 and sends the connection confirmation response data to the received data analysis section 16. The received data analysis section 16 analyzes the connection confirmation response data and sends the analysis result of the data to the display control section 14. The display control section 14 controls the display section 13 to display a list of the PCs that sent back the connection confirmation response data to the scanner 501 on the basis of the analysis result. The user can confirm the PCs that are connected to the scanner 501 by the list.

In step S202, when the user selects the PC 2 from the list displayed on the display section 13 and holds down the setup button 121, the terminal information request data generation section 180 of the transmission data generation section 518 generates the terminal information request data. The data transmission section 19 transmits the terminal information request data to the PC 2 through the network interface 10 and the network 3.

In step S203, the data reception section 17 of the scanner 501 receives the terminal information response data from the PC 2 through the network interface 10. As shown in FIG. 24, the terminal information response data may include a destination IP address that is assigned to the scanner 501, or "192. 168. 1. 10," an originating IP address that is assigned to the PC 2, or "192. 168. 1. 55," and terminal information response items. The terminal information response items may include the PC information (e.g. identification information on the PC 2), the path information on a storage destination folder for the converted image data in the PC 2, the application program information, the file format information (data format information) corresponding to the application program and the start path information to start the application program. The application program information notifies names of application programs that are available in the PC 2.

In step S204, the data reception section 17 sends the terminal information response data to the received data analysis section 16. The received data analysis section 16 analyzes the terminal information response data and sends the analysis result of the data to the display control section 14. The display control section 14 controls the display section 13 to display the setup items selectably thereon on the basis of the analysis result. For example, as shown in FIG. 19, a selection list is displayed in a box for an application/file-format item.

In step S205, the user selects and specifies each item displayed on the display section 13 by touching on it. For example, as shown in FIG. 19, the user selects and specifies "A4" for a document size item, "300 dpi" for a resolution item, "color" for a chromatic mode item and "image editing software A/JPEG" for an application/file-format item. Note, however, that "PC 2" is automatically selected for a destination item by the scanner 501.

In step 206, the user touches the display format designation button 550 on the setup screen to switch from the setup screen to the display format designation screen, on which the user can specify the display format of the converted image data. The user selects and specifies a display magnification item and a display orientation item displayed on the display section 13 by touching on them. For example, as shown in FIG. 20, the user selects and specifies "90%" for the display magnification item and "portrait" for the display orientation item. The designation section 502 sets display magnification and display orientation of the converted image data on the basis of the user operation.

In step S207, when the user holds down the start button 122 of the operation section 12, the reading unit 11 reads an image of a document in accordance with conditions specified by the user.

In step S208, the reading unit 11 sends image data to the data conversion section 15. The data conversion section 15 converts the image data into a file format specified by the user.

In step S209, the generation section 581 of the transmission data generation section 518 generates the image data with application start instruction. Specifically, the generation section 581 adds the application start instruction information, the setup information specified by the user in step S205 and the display format information specified by the user in step S206 to the converted image data converted in step S208, thereby generating the image data with application start instruction. The application start instruction information may include the start path information obtained in step S203 and a start instruction command. As shown in FIG. 24, different start path information is provided for each application program. The generation section 581 puts start path information, which corresponds to the application program specified in step S205, in the application start instruction information. The application start instruction information and the display format information serve as additional information.

In step S210, the data transmission section 19 transmits the image data with application start instruction generated in step S209 to the PC 2 through the network interface 10 and the network 3.

Figure 26:
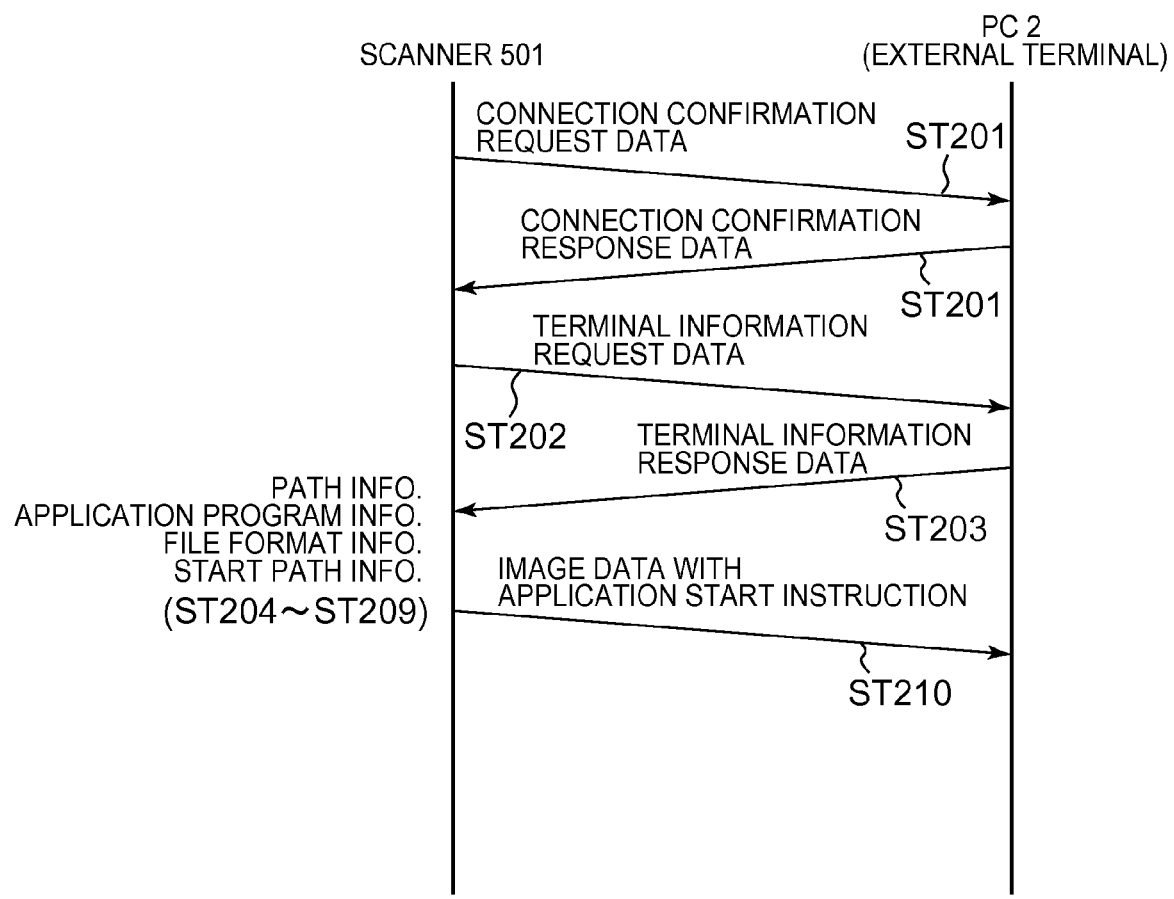
FIG. 26 is a communication diagram that shows data flow between the scanner and the PC of the second embodiment.

FIG. 26 is a communication diagram that shows data flow between the scanner 501 and the PC 2. In FIG. 26, steps similar to those shown in FIG. 23 have been given the same numerals and their description is omitted.

Next, the operation of the PC 2 will be described with reference to FIG. 21. The data reception section 310 of the PC cooperative software 631 installed on the PC 2 receives the connection confirmation request data from the scanner 501 through the network interface 51 and sends the data to the data analysis section 311. The data analysis section 311 analyzes the connection confirmation request data and commands the response data generation section 314 to generate the connection confirmation response data. The response data generation section 314 generates the connection confirmation response data and sends the data to the data transmission section 315. The data transmission section 315 transmits the connection confirmation response data to the scanner 501 through network interface 51. The connection confirmation response data may include the PC information on the PC 2 (e.g. identification information on the PC 2) and the IP address of the PC 2.

The data reception section 310 of the PC cooperative software 631 receives the terminal information request data from the scanner 501 through the network interface 51 and sends the data to the data analysis section 311. The data analysis section 311 analyzes the terminal information request data and gives a command to the information acquisition section 313. The information acquisition section 313 searches software stored in the storage section 53 of the PC 2 and compares the software searched in the storage section 53 with software listed in the data format list 233. The information acquisition section 313 creates the terminal information list 632 that defines the correspondence relationship among the software stored in the storage section 53, file formats corresponding to the software and start path information to start the software. The storage section 53 stores the terminal information list 632. The information acquisition section 313 commands the response data generation section 314 to generate the terminal information response data.

The response data generation section 314 generates the terminal information response data shown in FIG. 24 and sends the data to the data transmission section 315. The terminal information response data may include the path information on a storage destination folder for the converted image data, the PC information (e.g. identification information on the PC 2), the application program information, the file format information corresponding to the application program and the start path information to start the application program. The storage destination folder has been created in the PC 2 in advance. The PC information, or the identification information on the PC 2, can be obtained from the system setup data 230 stored in the storage section 53. The application program information, the file format information and the start path information can be obtained from the terminal information list 632. The data transmission section 315 transmits the terminal information response data to the scanner 501 through network interface 51. The data format list 233 may be stored in the storage section 53 when the PC cooperative software 631 is installed on the PC 2.

Figure 27:
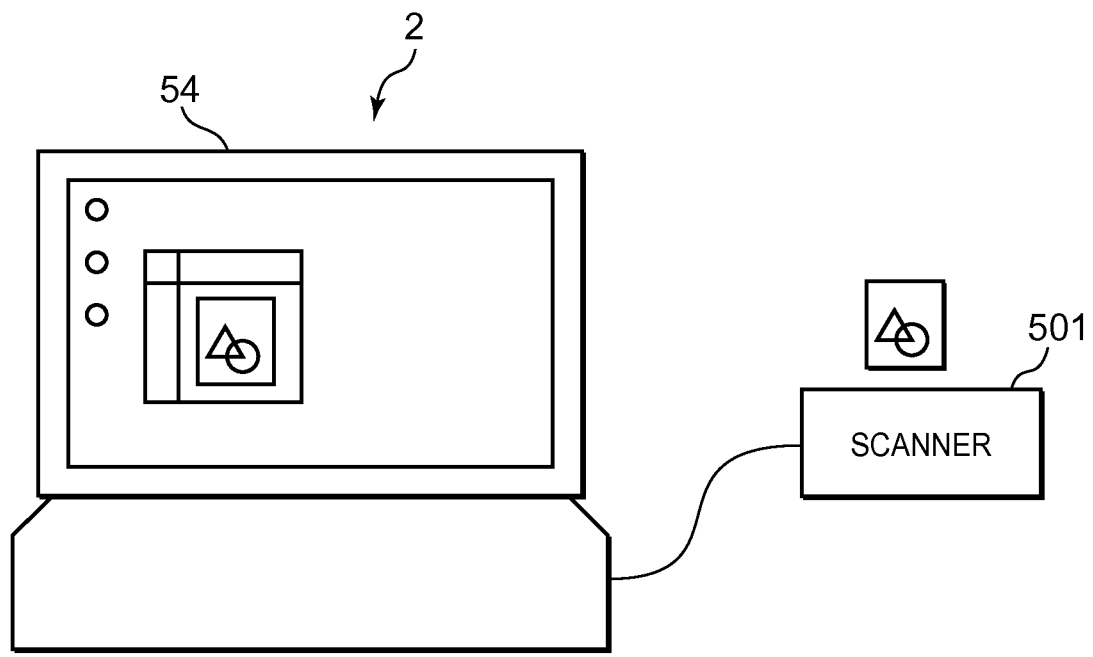
FIG. 27 is an exemplary view of a display screen of the display device when the application program is started on the PC.

The data reception section 310 of the PC cooperative software 631 receives the image data with application start instruction from the scanner 501 through the network interface 51 and sends the data to the data analysis section 311. The data analysis section 311 analyzes the image data with application start instruction and gives a command to the data storage section 316. The data storage section 316 stores the converted image data, which is included in the image data with application start instruction, in the storage destination folder designated by the path information in the setup information. The data storage section 316 also sends the application start instruction information, the display format information and the path information for the converted image data to the application start section 612. The application start section 612 starts the application program designated by the start path information in the application start instruction information, and controls the display device 54 of the PC 2 to display the converted image data, on the basis of the display format designated by the display format information. FIG. 27 is an exemplary view of a display screen of the display device 54 when the application program is started on the PC 2. The application program can be started by using the "CreateProcess" function of the Windows OS.

In the second embodiment, a different folder may be provided for each application program in the PC 2, so that converted image data from the scanner 501 is stored in a corresponding folder provided for the application program that can process the data, as in the modification of the first embodiment.

As described above, in the second embodiment, the scanner 501 transmits the converted image data to the PC 2 together with the application start instruction information and the display format information. Therefore, the application program specified by the user can be automatically started on the PC 2 and the converted image data can be displayed on the display device 54 in the display format specified by the user. Thus, the burden on the user to search out and start the application program for processing the converted image data can be reduced, thereby improving the usability of the image reading system.

While the first and second embodiments have been described with respect to the scanner as an image reader, the invention may be applicable to any other image reader such as a facsimile machine, a copier or a multifunction peripheral (MFP), which is capable of sending image data to an external terminal.

The image reader, the image reading system and the image reading method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. An image reader connected with an external terminal through a network, comprising:
   a reading unit configured to read an image;
   a reception section configured to receive terminal information from the external terminal, the terminal information including application program information and data format information, the application program information relating to an application program available in the external terminal, the data format information relating to a data format that can be processed by the application program;
   a data conversion section configured to convert image data read by the reading unit into said data format based on the terminal information;
   a transmission data generation section configured to generate transmission data, by adding additional information to the converted image data, the additional information including the application program information, the data format information, and creation instruction information for newly creating a folder where the converted image data is to be stored in the external terminal; and
   a transmission section configured to transmit the transmission data to the external terminal;
   wherein the transmission data generation section includes a generation section configured to generate request data requesting the terminal information from the external terminal.

2. The image reader according to claim 1, wherein the terminal information further includes storage destination information that designates a folder where the converted image data is to be stored.

3. The image reader according to claim 1, further comprising:
   a display section; and
   a display control section configured to control the display section to display the application program information and the data format information;
   wherein the application program information and the data format information are selectable by a user.

4. The image reader according to claim 1, wherein the additional information further includes setup information for reading the image with the reading unit.

5. The image reader according to claim 1, wherein the additional information further includes application start instruction information to start the application program on the external terminal.

6. The image reader according to claim 1, wherein the creation instruction information is added to the additional information when a folder, where the converted image data is to be stored, corresponding to the application program does not exist in the external terminal.

7. An image reading system, comprising:
   the image reader according to claim 1; and
   the external terminal connected with the image reader through a network;
   wherein the external terminal includes
      a data reception section configured to receive the transmission data, and
      a controller configured to process the converted image data on the basis of the additional information included in the transmission data.

8. The image reading system according to claim 7, wherein the controller creates the folder according to the creation instruction information and stores the converted image data in the created folder.

9. The image reading system according to claim 8, wherein the folder is different for each application program that processes the converted image data.

10. The image reading system according to claim 8, wherein the external terminal further includes
   a display section, and
   a received information display control section configured to control the display section to display storage destination information indicating the folder.

11. The image reading system according to claim 7, wherein the additional information further includes application start instruction information to start the application program, the application program configured to process the converted image data, and the external terminal further includes an application start section configured to start the application program on the basis of the application start instruction information.

12. An image reading method performed by an image reading system that includes an image reader and an external terminal connected to each other through a network, comprising:
   requesting terminal information from the external terminal by the image reader, the terminal information including application program information and data format information, the application program information relating to an application program available in the external terminal, the data format information relating to a data format that can be processed by the application program;
   transmitting the terminal information from the external terminal to the image reader;
   reading an image in the image reader;
   converting the image data into said data format based on the terminal information in the image reader;
   generating transmission data by adding additional information to the converted image data in the image reader, the additional information including the application program information, the data format information, and creation instruction information for newly creating a folder where the converted image data is to be stored in the external terminal; and
   transmitting the transmission data from image reader to the external terminal.

13. The image reading method according to claim 12, further comprising:
   creating the folder according to the creation instruction information in the external terminal;
   storing the converted image data in the created folder; and
   displaying storage destination information indicating the folder on a display section in the external terminal.

14. The image reading method according to claim 12, wherein the additional information further includes application start instruction information to start an application program, the application program configured to process the converted image data, the method further comprising:
   starting the application program based on the application start instruction information on the external terminal.

15. The image reading method according to claim 12, further comprising:
   displaying the application program information and the data format information on a display section in the image reader, the application program information and the data format information being selectable by a user; and
   designating the predetermined data format in accordance with the user's selection in the image reader.

16. The image reading method according to claim 12, wherein the creation instruction information is added to the additional information when a folder, where the converted image data is to be stored, corresponding to the application program does not exist in the external terminal.

* * * * *